US012663019B2

(12) United States Patent
Spaulding et al.

(10) Patent No.: US 12,663,019 B2
(45) Date of Patent: Jun. 23, 2026

(54) FAN ASSEMBLY

(71) Applicant: MILWAUKEE ELECTRIC TOOL CORPORATION, Brookfield, WI (US)

(72) Inventors: Christopher S. Spaulding, Green Bay, WI (US); Alexander J. Goodman, Milwaukee, WI (US); Austin F. de Veer, Lake Orion, MI (US); Ellen M. Owens, Wauwatosa, WI (US); Scott T. Moeller, Richfield, WI (US); John S. Scott, Brookfield, WI (US); Timothy J. Campbell, Brookfield, WI (US); Jules F. Miller, Wauwatosa, WI (US); Christopher J. Metcalf, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 27 days.

(21) Appl. No.: 17/694,141

(22) Filed: Mar. 14, 2022

(65) Prior Publication Data

US 2022/0290679 A1 Sep. 15, 2022

Related U.S. Application Data

(60) Provisional application No. 63/294,935, filed on Dec. 30, 2021, provisional application No. 63/160,305, filed on Mar. 12, 2021.

(51) Int. Cl.
 *F04D 29/52* (2006.01)
 *F04D 25/06* (2006.01)
 (Continued)

(52) U.S. Cl.
 CPC ....... *F04D 29/522* (2013.01); *F04D 25/0673* (2013.01); *F04D 25/08* (2013.01);
 (Continued)

(58) Field of Classification Search
 CPC .... F04D 19/002; F04D 25/0673; F04D 25/08; F04D 25/084; F04D 29/522;
 (Continued)

(56) References Cited

U.S. PATENT DOCUMENTS

| 212,336 | A | 2/1879 | Weston |
| 2,011,791 | A | 8/1935 | Barrett |
 (Continued)

FOREIGN PATENT DOCUMENTS

| CN | 2750090 Y | 1/2006 |
| CN | 2833197 Y * | 11/2006 |
 (Continued)

OTHER PUBLICATIONS

International Search Report and Written Opinion for Application No. PCT/US2022/020167 dated Jun. 30, 2022 (11 pages).
(Continued)

*Primary Examiner* — Charles G Freay
*Assistant Examiner* — Joseph S. Herrmann
(74) *Attorney, Agent, or Firm* — Michael Best & Friedrich LLP

(57) ABSTRACT

A battery powered fan assembly includes a fan housing that at least partially defines an airflow chamber, a plurality of fan blades positioned within the airflow chamber, a motor operable to rotate the plurality of fan blades, a battery receptacle configured to receive a removably battery pack to power the motor, and a base assembly configured to be placed on a support surface. The base assembly includes a first frame segment coupled to the fan housing, a second frame segment pivotally coupled to the first frame segment, and a third frame segment pivotally coupled to the second frame segment. The base assembly is configured to be collapsed into a storage configuration in which each of the first, second, and third frame segments are folded onto each (Continued)

other and expanded to a first deployed configuration in which the fan housing is elevated above the support surface by a first height.

19 Claims, 32 Drawing Sheets

(51) Int. Cl.

| | |
|---|---|
| *F04D 25/08* | (2006.01) |
| *F04D 29/60* | (2006.01) |
| *F04D 29/64* | (2006.01) |
| *F04D 29/70* | (2006.01) |
| *F04D 19/00* | (2006.01) |
| *F16D 41/18* | (2006.01) |

(52) U.S. Cl.
CPC ......... *F04D 29/601* (2013.01); *F04D 29/646* (2013.01); *F04D 29/703* (2013.01); *F04D 19/002* (2013.01); *F04D 25/084* (2013.01); *F16D 41/185* (2013.01)

(58) Field of Classification Search
CPC .... F04D 29/601; F04D 29/646; F04D 29/703; Y10T 403/59; Y10T 403/591; Y10T 403/595; Y10T 403/608; F16B 7/04; F16B 7/0433; F16D 41/185
USPC ........... 248/222.11, 222.13, 222.52, 231.51, 248/231.81, 292.13, 316.5, 316.7; 403/321, 322.1, 322.4, 330
See application file for complete search history.

(56) References Cited

U.S. PATENT DOCUMENTS

| | | | |
|---|---|---|---|
| 2,830,779 A | | 4/1958 | Wentling |
| 3,244,124 A | | 4/1966 | Accarino et al. |
| 4,396,352 A | | 8/1983 | Pearce |
| 4,518,002 A | * | 5/1985 | Battiston, Sr. ........... A61H 3/00 403/328 |
| 4,697,305 A | * | 10/1987 | Boothe ...................... E06C 1/32 16/349 |
| 5,082,222 A | * | 1/1992 | Hsu ........................ F16M 11/16 248/170 |
| 5,232,090 A | | 8/1993 | Raab et al. |
| 5,685,165 A | | 11/1997 | Bigelow, Jr. |
| 6,126,415 A | | 10/2000 | Lasko |
| 6,256,193 B1 | * | 7/2001 | Janik ..................... G06F 1/1669 248/922 |
| 6,550,725 B1 | | 4/2003 | Watson |
| D505,836 S | | 6/2005 | Burkholder |
| 7,654,792 B2 | | 2/2010 | Kikuichi et al. |
| 7,753,184 B2 | | 7/2010 | Traner |
| 7,850,513 B1 | * | 12/2010 | Parker ..................... F24F 7/025 D13/102 |
| 8,413,593 B2 | | 4/2013 | Korb |
| 8,631,665 B1 | | 1/2014 | DeClementi |
| 8,734,109 B2 | | 5/2014 | He et al. |
| 9,267,698 B2 | | 2/2016 | Stearns |
| 9,677,703 B2 | | 6/2017 | He et al. |
| 10,184,479 B2 | | 1/2019 | Xu |
| 10,527,301 B2 | | 1/2020 | Schock |
| 10,618,692 B2 | | 4/2020 | Hori et al. |
| 10,876,545 B2 | | 12/2020 | Ediger |
| 11,092,279 B2 | | 8/2021 | Chen |
| 2004/0234384 A1 | | 11/2004 | Rardin |
| 2005/0166758 A1 | | 8/2005 | Volo et al. |
| 2006/0032259 A1 | | 2/2006 | White |
| 2006/0168925 A1 | | 8/2006 | Whittemore |
| 2009/0246015 A1 | | 10/2009 | Hsu |
| 2010/0150543 A1 | | 6/2010 | Fong |
| 2011/0220531 A1 | | 9/2011 | Meether et al. |
| 2012/0269663 A1 | * | 10/2012 | Kamiya ............. F04D 25/0673 417/411 |
| 2013/0004330 A1 | | 1/2013 | He et al. |
| 2015/0074927 A1 | | 3/2015 | Widmer et al. |
| 2016/0001428 A1 | | 1/2016 | Sun |
| 2016/0363256 A1 | * | 12/2016 | Mcdonnell .............. F04D 25/08 |
| 2017/0101301 A1 | | 4/2017 | Volin |
| 2019/0237984 A1 | | 8/2019 | Dorvil |
| 2020/0284425 A1 | | 9/2020 | Plato et al. |
| 2021/0207618 A1 | | 7/2021 | Ediger |
| 2021/0355964 A1 | * | 11/2021 | Shih ...................... F04D 29/646 |

FOREIGN PATENT DOCUMENTS

| | | | |
|---|---|---|---|
| CN | 202023755 U | | 11/2011 |
| CN | 103032349 A | | 4/2013 |
| CN | 105756977 A | | 7/2016 |
| CN | 106593915 A | * | 4/2017 |
| CN | 106979168 A | | 7/2017 |
| CN | 107061323 A | | 8/2017 |
| CN | 107269555 B | | 10/2017 |
| CN | 107387436 A | | 11/2017 |
| CN | 206801923 U | | 12/2017 |
| CN | 207018216 U | | 2/2018 |
| CN | 107781182 A | | 3/2018 |
| CN | 207111470 U | | 3/2018 |
| CN | 208966644 U | | 6/2019 |
| CN | 209212665 U | | 8/2019 |
| CN | 209856056 U | | 12/2019 |
| CN | 209875498 U | | 12/2019 |
| CN | 209925262 U | | 1/2020 |
| CN | 210152944 U | | 3/2020 |
| CN | 210291322 U | | 4/2020 |
| CN | 210565367 U | | 5/2020 |
| CN | 111336121 A | | 6/2020 |
| CN | 210716820 U | | 6/2020 |
| CN | 211193824 U | | 8/2020 |
| CN | 211289452 U | | 8/2020 |
| CN | 211370795 U | | 8/2020 |
| CN | 111608934 A | | 9/2020 |
| CN | 111648982 A | | 9/2020 |
| CN | 211778109 U | | 10/2020 |
| CN | 111997922 A | | 11/2020 |
| CN | 211909482 U | | 11/2020 |
| CN | 212003643 U | | 11/2020 |
| CN | 112797010 A | | 2/2021 |
| CN | 212623514 U | | 2/2021 |
| CN | 212867983 U | | 4/2021 |
| CN | 212899064 U | | 4/2021 |
| CN | 212928240 U | | 4/2021 |
| CN | 212985594 U | | 4/2021 |
| CN | 213331594 U | | 6/2021 |
| CN | 213331629 U | | 6/2021 |
| CN | 213628066 U | | 7/2021 |
| CN | 213775764 U | | 7/2021 |
| CN | 213981299 U | | 8/2021 |
| CN | 214533625 U | | 10/2021 |
| CN | 214617169 U | | 11/2021 |
| CN | 214742213 U | | 11/2021 |
| CN | 215093488 U | | 12/2021 |
| DE | 102012218601 A1 | | 4/2014 |
| DE | 202014101611 U1 | | 7/2014 |
| DE | 102017104823 A1 | | 9/2017 |
| KR | 20100006577 U | * | 6/2010 |
| KR | 2020100006577 U | | 6/2010 |
| KR | 20100124454 A | * | 11/2010 |
| KR | 1020100124454 A | | 11/2010 |
| KR | 200485116 Y1 | | 12/2017 |
| WO | 2016127454 A1 | | 8/2016 |
| WO | 2016176802 A1 | | 11/2016 |
| WO | 2018098504 A1 | | 5/2018 |

OTHER PUBLICATIONS

International Search Report and Written Opinion for Application No. PCT/US2022/020178 dated Jun. 23, 2022 (12 pages).

(56)          References Cited

OTHER PUBLICATIONS

International Search Report and Written Opinion for Application No. PCT/US2022/020183 dated Jun. 20, 2022 (11 pages).

\* cited by examiner

FAN ASSEMBLY

CROSS-REFERENCE TO RELATED APPLICATIONS

This application claims priority to U.S. Provisional Patent Application No. 63/160,305, filed Mar. 12, 2021, and to U.S. Provisional Patent Application No. 63/294,935, filed Dec. 30, 2021, the entire contents of which are incorporated by reference herein.

FIELD

The present disclosure relates to cooling systems and, more particularly, to portable fan assemblies configured to be used in a workspace.

SUMMARY

In one embodiment, the invention provides a battery powered box-type fan assembly including a fan housing that at least partially defines an airflow chamber; a plurality of fan blades positioned within the airflow chamber; a motor operable to rotate the plurality of fan blades; a battery receptacle positioned on the fan housing, the battery receptacle configured to receive a removable battery pack to power the motor; and a base coupled to the fan housing and configured to be placed on a support surface, the base elevating the fan housing above the support surface and operable to support the fan housing in multiple configurations. The base includes a stand pivotable relative to the fan housing between a collapsed position, in which the stand is flipped up toward the fan housing, and a deployed position, in which the stand extends away from the fan housing and is configured to contact the support surface.

In another embodiment, the invention provides a battery powered box-type fan assembly including a fan housing that at least partially defines an airflow chamber; a plurality of fan blades positioned within the airflow chamber; a motor operable to rotate the plurality of fan blades; a battery receptacle positioned on the fan housing, the battery receptacle configured to receive a removable battery pack to power the motor; and a base coupled to the fan housing and configured to be placed on a support surface. The base includes a body elevating the fan housing above the support surface and operable to support the fan housing in multiple configurations, a stand movable relative to the body, and a latch coupled to the body and the stand, the latch releasably securing a position of the stand relative to the body, the latch being manually operable to allow movement of the stand relative to the body.

In another embodiment, the invention provides a battery powered box-type fan assembly including a fan housing having a first face, a second face opposite the first face, and a perimeter extending between the first and second faces, the first face, the second face, and the perimeter defining a volume therebetween, the fan housing at least partially defines an airflow chamber; a plurality of fan blades positioned within the airflow chamber; a motor operable to rotate the plurality of fan blades; a base pivotally coupled to the fan housing and configured to be placed on a support surface, the base elevating the fan housing above the support surface, wherein the fan housing is pivotable relative to the base about a pivot axis that is parallel to the support surface; a battery receptacle positioned on the fan housing and electrically coupled to the motor; and a battery pack removably coupled to the battery receptacle, the battery pack positioned within the volume of the fan housing and beneath the pivot axis when coupled to the battery receptacle.

In still another embodiment, the invention provides a battery powered fan assembly including a fan housing that at least partially defines an airflow chamber; a plurality of fan blades positioned within the airflow chamber; a motor operable to rotate the plurality of fan blades; a battery receptacle configured to receive a removably battery pack to power the motor; and a base assembly configured to be placed on a support surface, the base assembly including a first frame segment coupled to the fan housing, a second frame segment pivotally coupled to the first frame segment, and a third frame segment pivotally coupled to the second frame segment. The base assembly is configured to be collapsed into a storage configuration in which each of the first, second, and third frame segments are folded onto each other, the base assembly is configured to be expanded to a first deployed configuration in which the fan housing is elevated above the support surface by a first height, and the base assembly is configured to be expanded to a second deployed configuration in which the fan housing is elevated above the support surface by a second height that is different than the first height.

In another embodiment, the invention provides a battery powered fan assembly including a fan housing that at least partially defines an airflow chamber; a plurality of fan blades positioned within the airflow chamber; a motor operable to rotate the fan blades; a battery receptacle configured to receive a removable battery pack to power the motor; and a base assembly configured to be placed on a support surface, the base assembly including a first frame segment coupled to the fan housing, a second frame segment having a first end and a second end opposite the first end, the first end pivotally coupled to the first frame segment, a third frame segment pivotally coupled to the second end of the second frame segment, and a self-locking latch positioned between the second frame segment and the third frame segment, the self-locking latch biased into a locked position to inhibit relative movement between the second frame segment and the third frame segment.

In yet another embodiment, the invention provides a battery powered fan assembly including a fan housing that at least partially defines an airflow chamber; a plurality of fan blades positioned within the airflow chamber; a motor operable to rotate the fan blades; a battery receptacle configured to receive a removable battery pack to power the motor; and a base assembly configured to be placed on a support surface, the base assembly including a first frame segment coupled to the fan housing, the first frame segment having a first reduced size gripping portion, a second frame segment pivotally coupled to the first frame segment, the second frame segment having a second reduced size gripping portion, and a third frame segment pivotally coupled to the second frame segment. The base assembly is configured to be collapsed into a storage configuration in which each of the first, second, and third frame segments are folded onto each other, and the base assembly is configured to be expanded to a deployed configuration in which the first, second, and third frame segments are unfolded from one another.

In still another embodiment, the invention provides a fan assembly including a base including walls that at least partially define a storage area therebetween; a fan housing that at least partially defines an airflow chamber, the fan housing moveably coupled to the base between a stored position, in which the fan housing is positioned within the storage area, and a deployed position, in which the fan housing is at least partially positioned outside of the storage area; a plurality of fan blades positioned within the airflow chamber; a motor operable to rotate the plurality of fan blades; a battery receptacle configured to receive a removable battery pack to power the motor; a mating interface formed on at least one of the base and the fan housing, the mating interface configured to interact with a complementary mating interface formed on a stackable element of the stackable storage system; and a latch mounted to the base, the latch configured to selectively inhibit relative movement between the fan assembly and the stackable element while the mating interface of the fan assembly interacts with the complementary mating interface of the stackable element.

In another embodiment, the invention provides a fan assembly including a base including a first wall having a first mating interface, the first mating interface configured to interact with another stackable element of the stackable storage system, a second wall opposite the first wall and having a second mating interface, the second mating interface configured to interact with another stackable element of the stackable storage system, and a side wall extending between the first wall and the second wall, the side wall defining an opening to a storage area in the base. The fan assembly further including a fan housing that at least partially defines an airflow chamber, the fan housing being moveably coupled to base between a stored position, in which the fan housing is positioned within the storage area, and a deployed position, in which the fan housing is at least partially extended out of the storage area through the opening; a plurality of fan blades positioned within the airflow chamber; a motor operable to rotate the plurality of fan blades; and a battery receptacle configured to receive a removable battery pack to power the motor.

In still yet another embodiment, the invention provides a fan assembly including a base including walls that at least partially define a storage area therebetween; a fan housing that at least partially defines an airflow chamber; a plurality of fan blades positioned within the airflow chamber; a motor operable to rotate the fan blades; a battery receptacle configured to receive a removable battery pack to power the motor; and a coupler including a first end pivotally connected to the base about a first axis, and a second end rotatably connected to the fan housing about a second axis that is transverse relative to the first axis. The fan housing is configured to be selectively pivoted relative to the base about the first axis to move the fan housing into and out of the storage area, and the fan housing is configured to be selectively rotated relative to the base about the second axis to change a direction of airflow generated by the plurality of fan blades.

Other aspects of the invention will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

DETAILED DESCRIPTION

With brief reference to FIGS. 1-24, each embodiment may be powered by a battery pack 1, also referred to as a removable battery pack. The battery pack 1 may be a power tool battery pack generally used to power a power tool, such as an electric drill, an electric saw, and the like (e.g., an 18 volt rechargeable battery pack, or an M18 REDLITHIUM battery pack sold by Milwaukee Electric Tool Corporation). The battery pack 1 may include lithium ion (Li-ion) cells. In alternate embodiments, the battery packs may be of a different chemistry (e.g., nickel-cadmium (NiCa or NiCad), nickel-hydride, and the like). The battery pack 1 may be an 18 volt battery pack, a 4 volt battery pack, a 28 volt battery pack, a 40 volt battery pack, or a battery pack of any other voltage such that the capacity of the battery pack may vary. The battery pack may further include an indicator to display the current state of charge of the battery pack and/or other characteristics of the battery pack.

Figure 1:
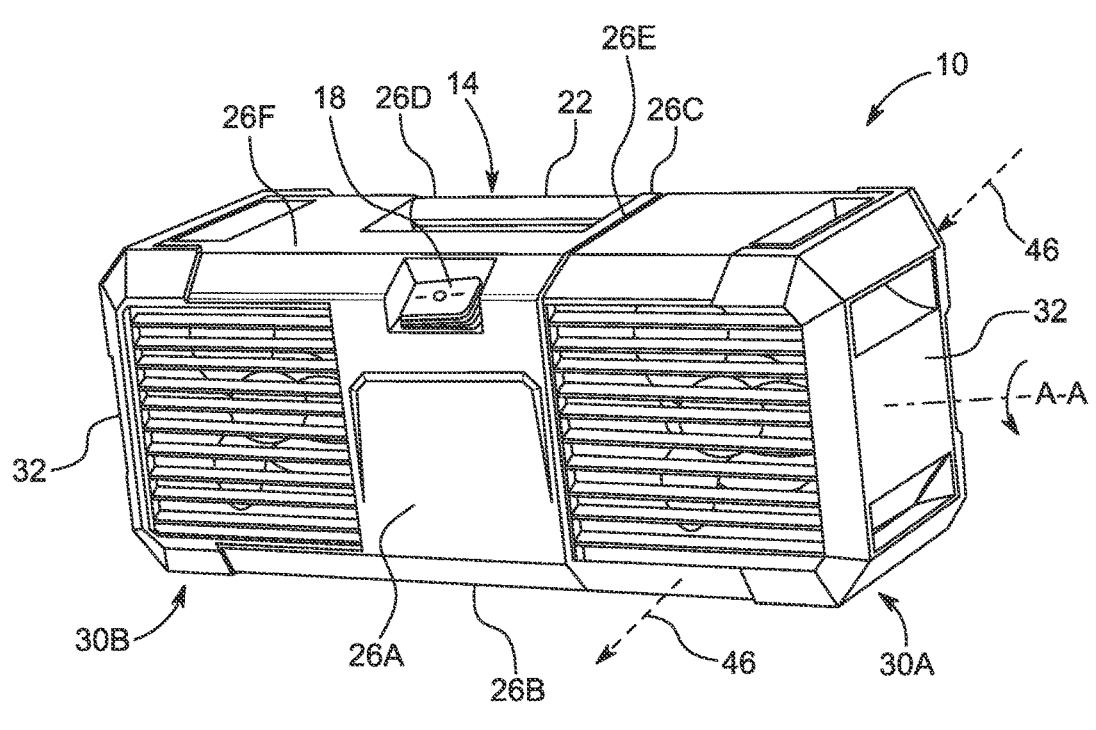
FIG. 1 is a perspective view of a portable fan assembly, according to one embodiment.
Figure 2:
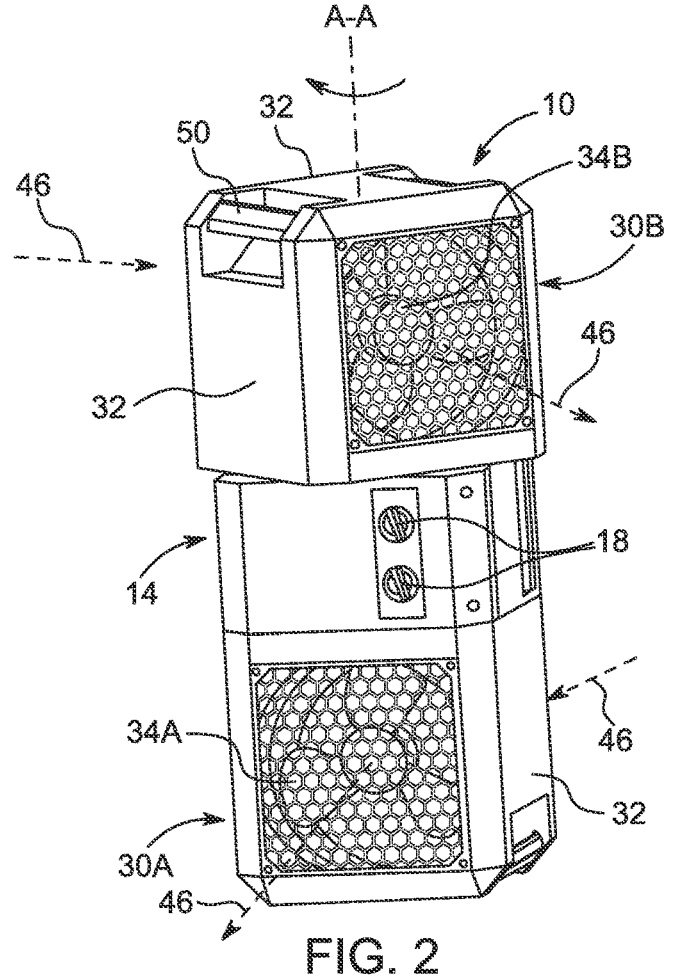
FIG. 2 is a perspective view of the portable fan assembly of FIG. 1, illustrating a fan head in a rotated position.
Figure 3:
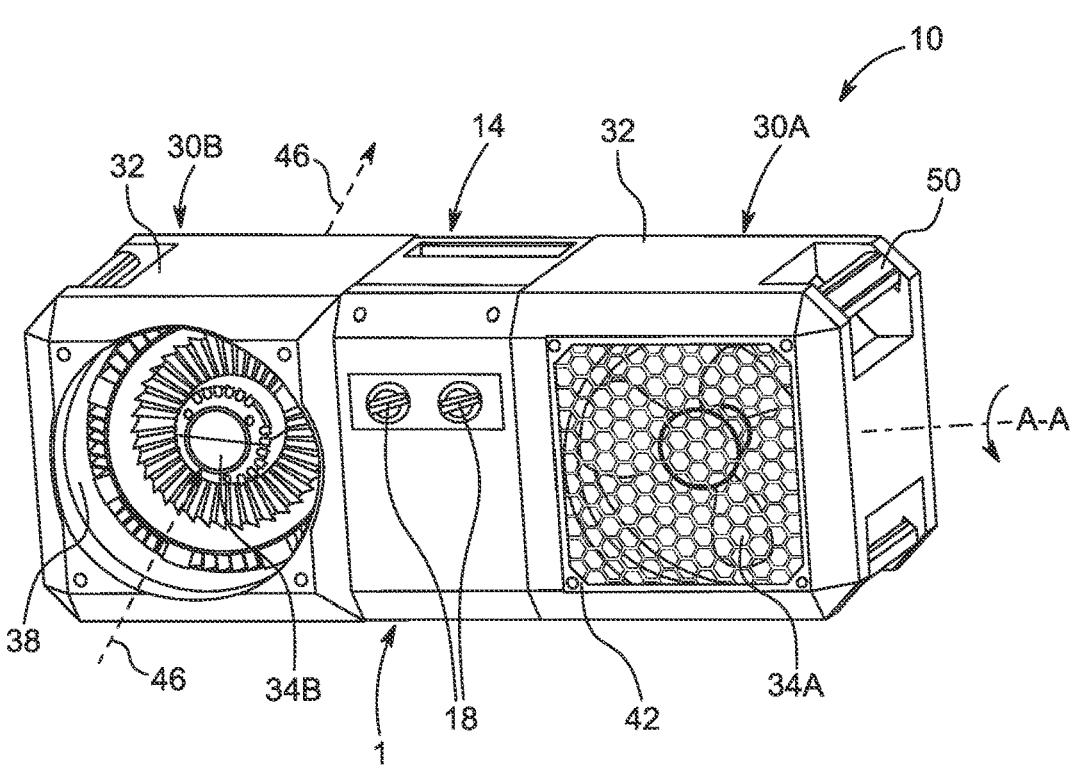
FIG. 3 is a perspective view of the portable fan assembly of FIG. 1 illustrating a fan head in a rotated position of about 180 degrees.

FIGS. 1-3 illustrate a portable cooling system or fan assembly 10 according to one embodiment. The fan assembly 10 is configured to provide airflow to an area such as a workspace, a workshop, a jobsite, or the like. The fan assembly 10 may include a main body 14 that supports a user interface 18 and a handle 22 configured to accommodate carrying the fan assembly 10. The user interface 18 may be a button, a switch, a toggle, or another selector that allows a user to interact and thus control an operation of the fan assembly 10. In the illustrated embodiment, the fan assembly 10 has an overall rectangular shape, although other polygonal shapes are considered. In some embodiments, the fan assembly 10 may be generally curved and/or oblong.

As illustrated in FIG. 1, the main body 14 is generally cuboid and includes at least four support faces 26A, 26B, 26C, 26D upon which the fan assembly 10 may be supported when, for example, the fan assembly 10 is set on a surface such as a floor surface, table top, or the like. As illustrated in FIGS. 2 and 3, the main body 14 may alternatively have a narrowed or thinned width, thickness, or the like. The fan assembly 10 further includes a first fan head 30A and a second fan head 30B. The fan heads 30A, 30B may each be rotatably coupled to opposing faces 26E, 26F of the main body 14 and rotatable relative the main body 14 about an axis A-A. The first fan head 30A may support a first fan 34A, such as a blade(s), impeller, or the like rotatably supported therein. The second fan head 30B may support a second fan 34B, such as a blade(s), impeller, or the like rotatably supported therein. The first fan 34A and the second fan 34B may be rotated by a battery powered motor or otherwise powered (e.g., wired connection) motor to generate airflow in a desired direction.

Each fan head 30A, 30B may also be polygonal shaped. In the illustrated embodiment, the main body 14 and fan heads 30A, 30B are similarly shaped and may have similar dimensions. Namely, the support faces 26A, 26B, 26C, 26D of the main body 14 may selectively align with faces 32 of the fan heads 30A, 30B to give the fan assembly 10 a generally rectangular shape. In the illustrated embodiment, each fan head 30A, 30B is generally cuboid.

As best shown in FIG. 2, the fan heads 30A, 30B are rotatable about the axis A-A relative to one another, as well as relative the main body 14. Each fan head 30A, 30B may further support a shroud 38 and a grille 42. In one example construction of the fan assembly 10, the blades of the first fan 34A and the second fan 34B are rotated to generate an airflow 46 generally entering the respective fan heads 30A, 30B through a rear portion and along the shrouds 38 and exiting through the grilles 42.

As further shown in FIG. 2, a direction of airflow 46 may be selectively changed by rotating one of the fan heads 30A, 30B or by rotating the fan assembly 10. In some scenarios, as shown in FIG. 3, the direction of the airflow 46 generated by each fan head 30A, 30B may be relatively offset by about 180 degrees. In other scenarios, the direction of the airflow 46 generated by each fan head 30A, 30B may be relatively offset by about another about between 0 degrees and 180 degrees, including 0 degrees.

As even further shown in FIG. 2, the fan assembly 10 may be supported on any face 32 of the fan heads 30A, 30B including a face 32 supporting the grille 42, a face 32 intersecting the axis A-A, or another face 32. Each fan head 30A, 30B may further support one or more auxiliary handles 50. The auxiliary handles 50, similar to the handle 22, may be configured to accommodate carrying the fan assembly 10. The user interface 18 may be operable to select a rotational speed and/or rotational direction of the blades of the fans 34A, 34B. In the illustrated embodiment, the user interface 18 is operable to selectively control both of the fans 34A, 34B together, or each of the fans 34A, 34B independently.

Figure 4:
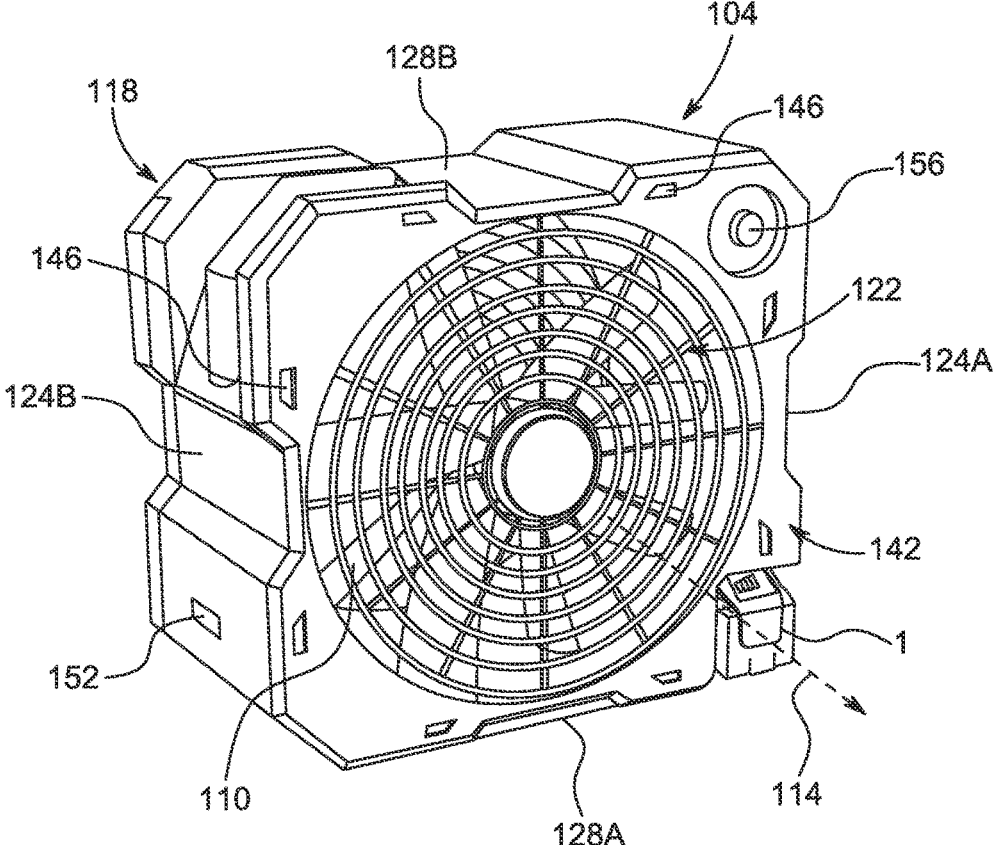
FIG. 4 is a perspective view of a portable cooling system including one or more fan assemblies, according to another embodiment.
Figure 5:
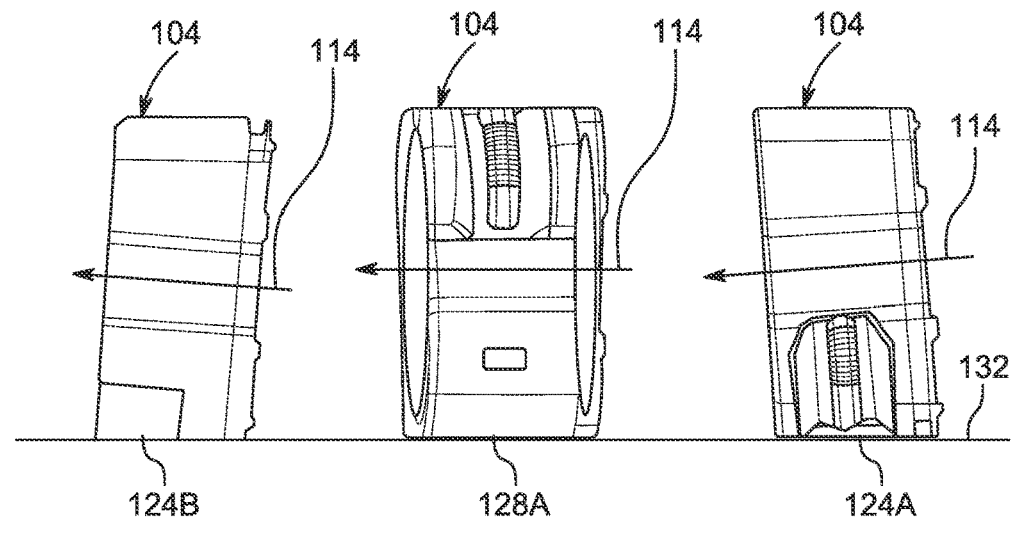
FIG. 5 is a side perspective view of a single fan assembly of FIG. 4 supported on different support faces.
Figure 6:
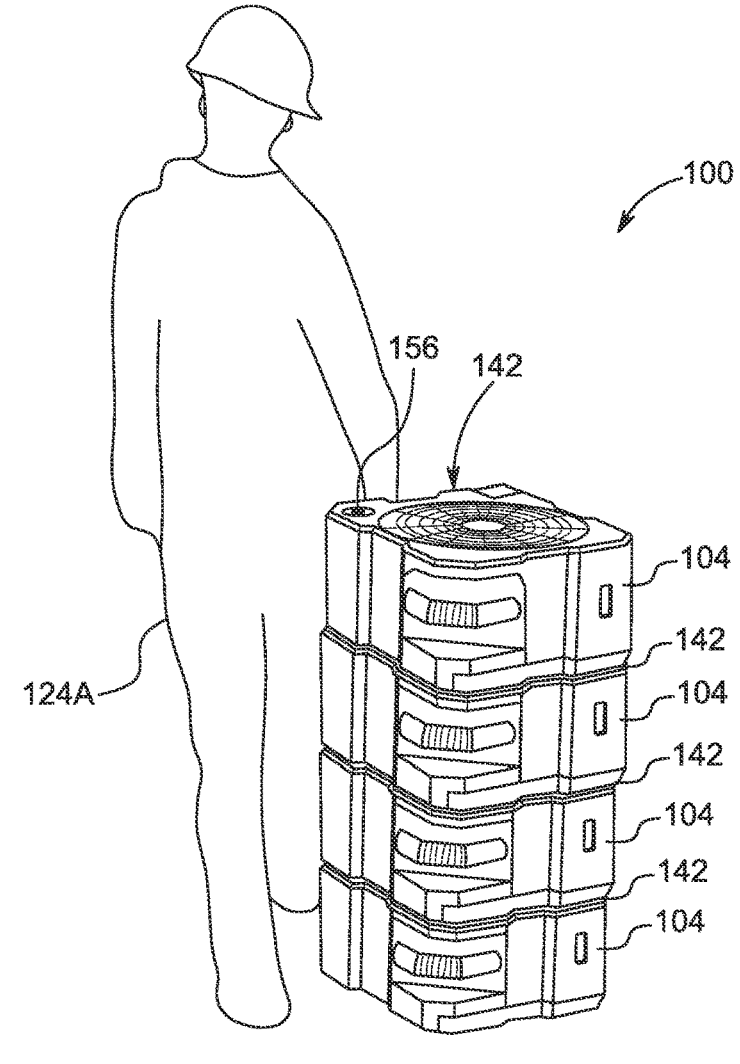
FIG. 6 is a side perspective view of the portable cooling system of FIG. 4, illustrating multiple fan assemblies in a stacked configuration.

FIGS. 4-6 illustrate a portable cooling system 100 including one or more fan assemblies 104 according to another embodiment. The fan assembly 104 supports a fan 110 rotatably mounted therein. The fan 110 is configured to generate an airflow 114 through a fan body or shroud 118 and out a grille 122 positioned on a face of the fan assembly 104. As illustrated in FIG. 5, the fan assembly 104 may be formed of opposing first and second support faces 124A, 124B and opposing third and fourth support faces 128A, 128B. The support faces 124A . . . 128B are generally not faces that support the grille 122, but the fan assembly 104 could still be supported by one of such faces.

The first and second support faces 124A, 124B may be angled relative to the third and fourth support faces 128A, 128B such that a user may select an angle of airflow 114 direction by altering which support face 124A . . . 128B the fan assembly 104 is supported on. For example, when the fan assembly 104 is supported on the third or fourth support face 128A, 128B, airflow 114 may be generally parallel to a surface 132 upon which the fan assembly 104 is supported. When the fan assembly 104 is supported on the first support faces 124A and/or the second support faces 124B, airflow 114 may be generally offset relative the surface 132 upon which the fan assembly 104 is supported. In one embodiment, the airflow 114 is offset relative the surface 132 by about 4.5 degrees when the fan assembly 104 is supported on the first support faces 124A or the second support faces 124B.

The portable cooling system 100 may include a plurality of fan assemblies 104 that are stackable relative one another at an interface 142. The interface 142 may include complimentary mating features 146 formed on opposing faces of adjacently stacked fan assemblies 104. The mating features 146 allow the fan assemblies 104 to be stacked and retained in a stable stacked configuration.

Each fan assembly 104 may further include a filter slot for replaceably receiving a filter, such as a standard 20 inch furnace filter. The fan assemblies 104 may receive power from the battery pack 1 and supply an AC or DC output through a ground fault circuit interrupting (GFCI) 120V outlet 152. Each fan assembly 104 may even further include a variable speed user interface 156. In some embodiments, each fan assembly 104 may have an overall square dimension of approximately twenty inches.

Figure 7:
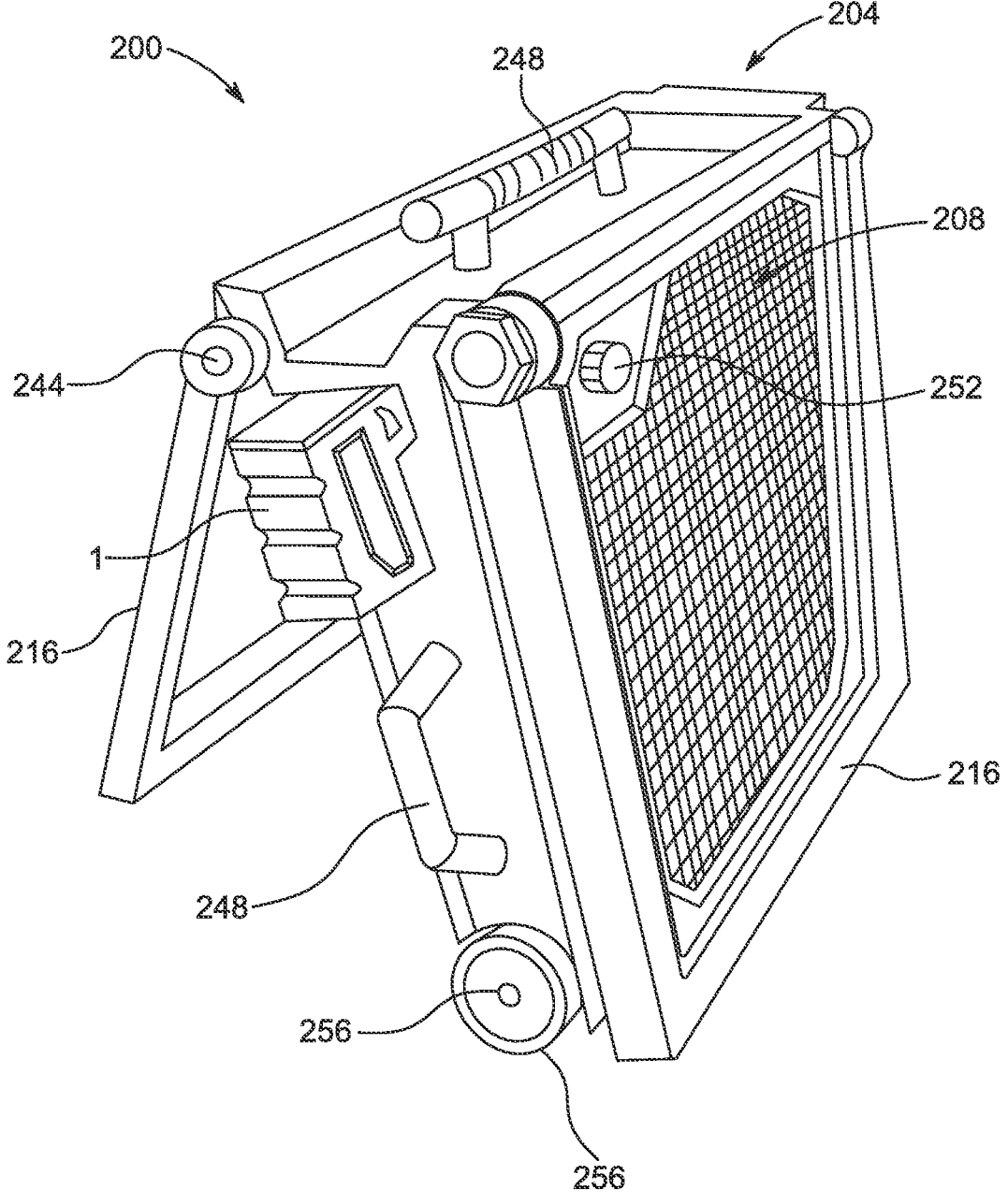
FIG. 7 is a perspective view of a portable fan assembly, according to another embodiment.
Figure 8:
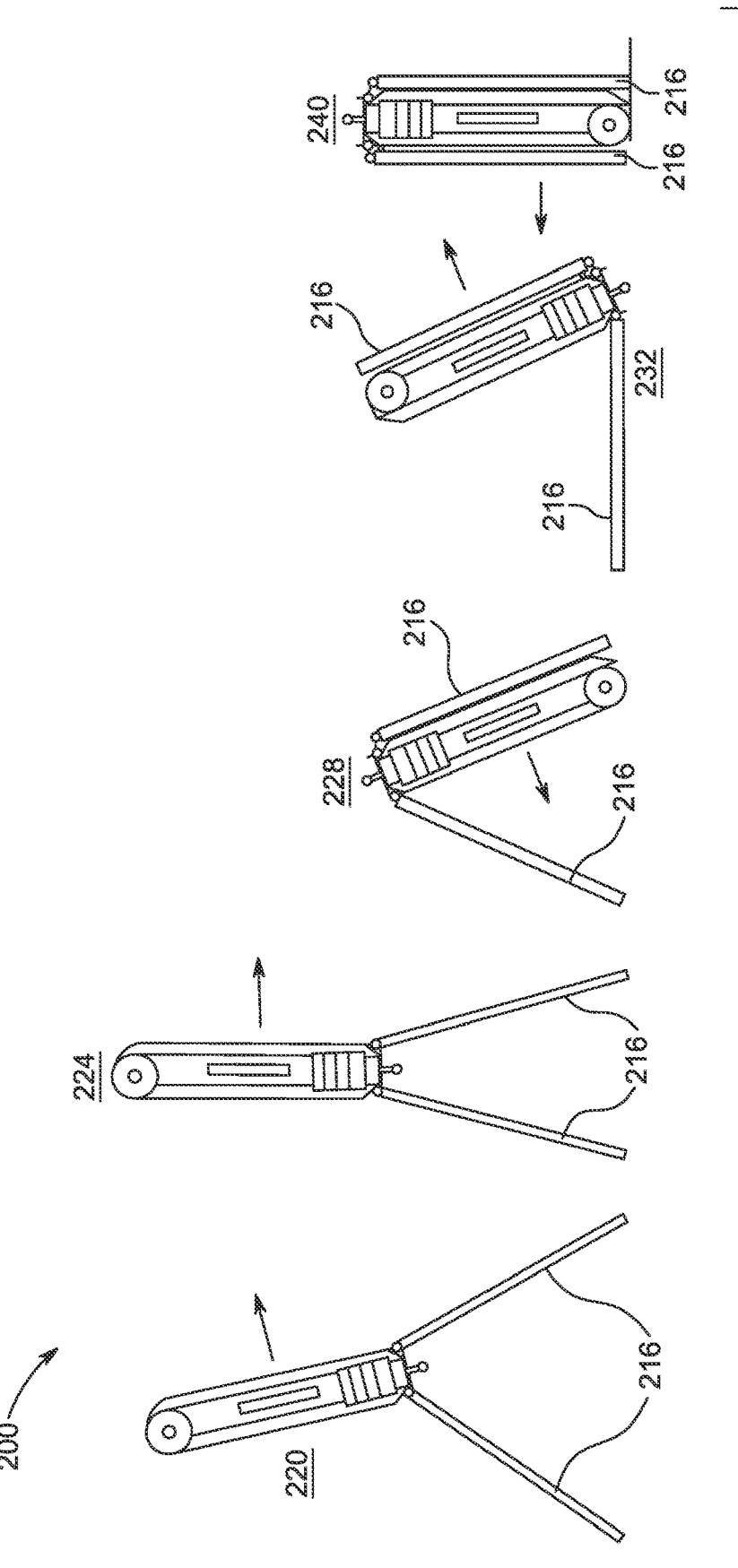
FIG. 8 is a side view of the portable fan assembly of FIG. 7 in multiple configurations.
Figure 9:
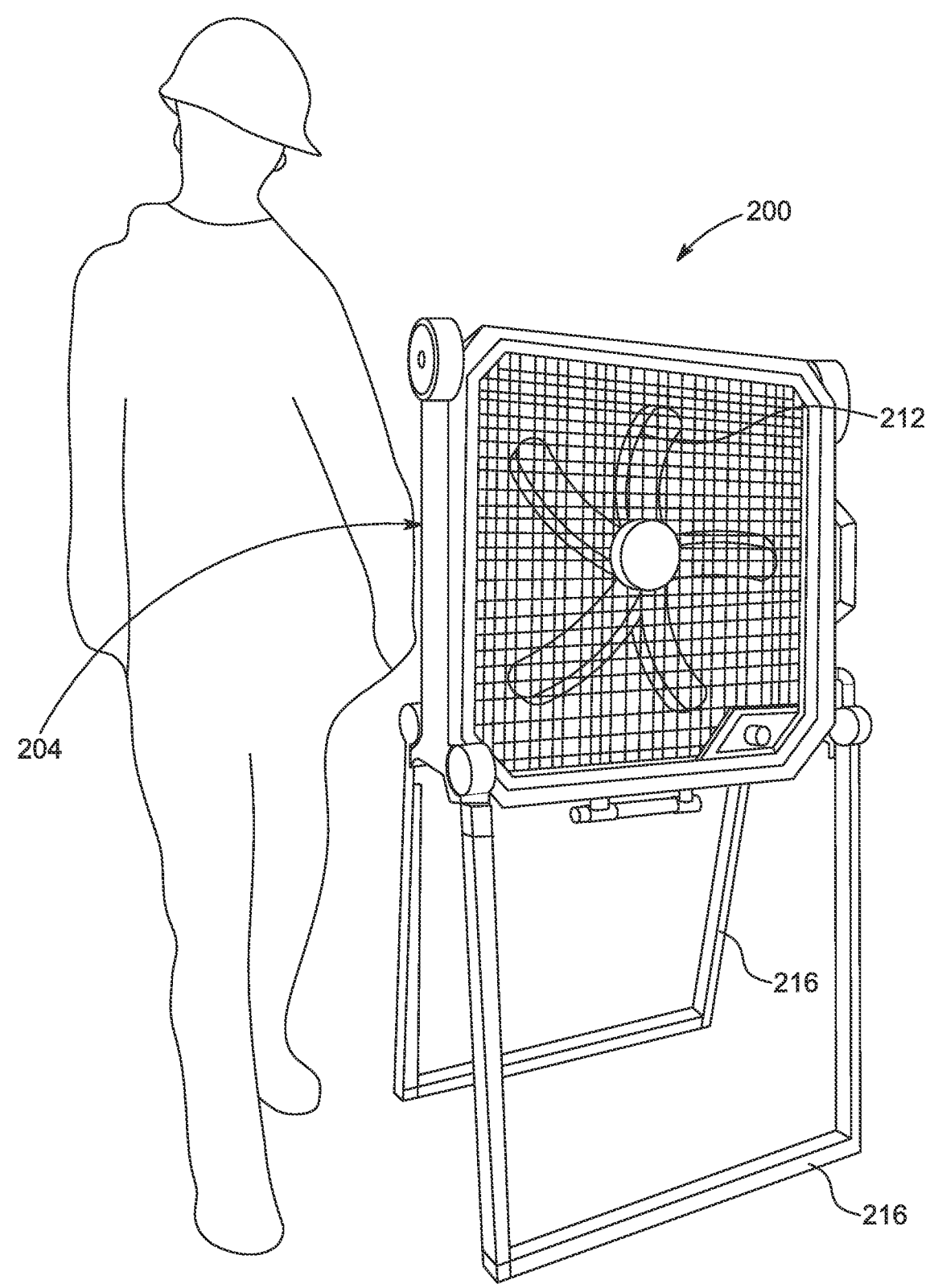
FIG. 9 is a perspective view of the portable fan assembly of FIG. 7 in a standing configuration.

FIGS. 7-9 illustrate a fan assembly 200, such as a portable fan assembly, according to another embodiment. The fan assembly 200 may include a shroud or housing 204, a grille 208, and a fan 212 rotatably supported within the housing 204. Legs 216 may be rotatably coupled to the fan assembly 200 to support the fan assembly 200 in multiple configurations. In the illustrated embodiment, the legs 216 are rotatably coupled to the housing 204. The fan 212 may be rotated by a battery powered motor or otherwise powered (e.g., wired connection) motor to generate airflow in a desired direction.

As shown in FIG. 8, the legs 216 allow the fan assembly 200 to be operated and/or stored in multiple configurations including an elevated and tilted configuration 220, an elevated and level configuration 224, a first low height tilted configuration 228 in which the fan assembly 200 is supported on a surface by a portion of either leg 216 and the housing 204, a second low height tilted or level configuration 232 in which the fan assembly 200 is supported on the surface solely by either leg 216, and a collapsed configuration 240. A height of the fan assembly 200 in any elevated configuration (e.g., elevated and level configuration 224) may be similar to that of a user (FIG. 9). The legs 216 further allow for general universal adjustment of the fan assembly 200 to thereby direct airflow from the fan 212 in a desired direction.

Rotation of the legs 216 relative the housing 204 may be locked in a desired position via leg locks 244. The fan assembly 200 may further include handles 248 for accommodating carrying the fan assembly 200, one or more user interfaces 252 for controlling an operational output of the fan assembly 200, one or more battery packs 1, a filter (e.g., standard 20×20×1 inch air filter), and one or more rotatable ground engaging elements 256 (e.g., wheels, casters, etc.). One or both of the handles 248 may be a flexible material. One or both of the handles 248 may also be rigid and selectively wrapped with a cord, tape, or the like.

FIGS. 10-13 illustrate a fan assembly 300, such as a portable fan assembly, according to another embodiment. The fan assembly 300 may include a shroud or housing 304, a grille 308, and a fan 312 (e.g., blades) rotatably supported within the housing 304. One or more support bars 316 may be rotatably coupled to the fan assembly 300 to support the fan assembly 300 in multiple configurations. In the illustrated embodiment, the support bar 316 is rotatably coupled to the housing 304. The fan 312 may be rotated by a battery powered motor or otherwise powered (e.g., wired connection) motor to generate airflow in a desired direction.

Figure 10:
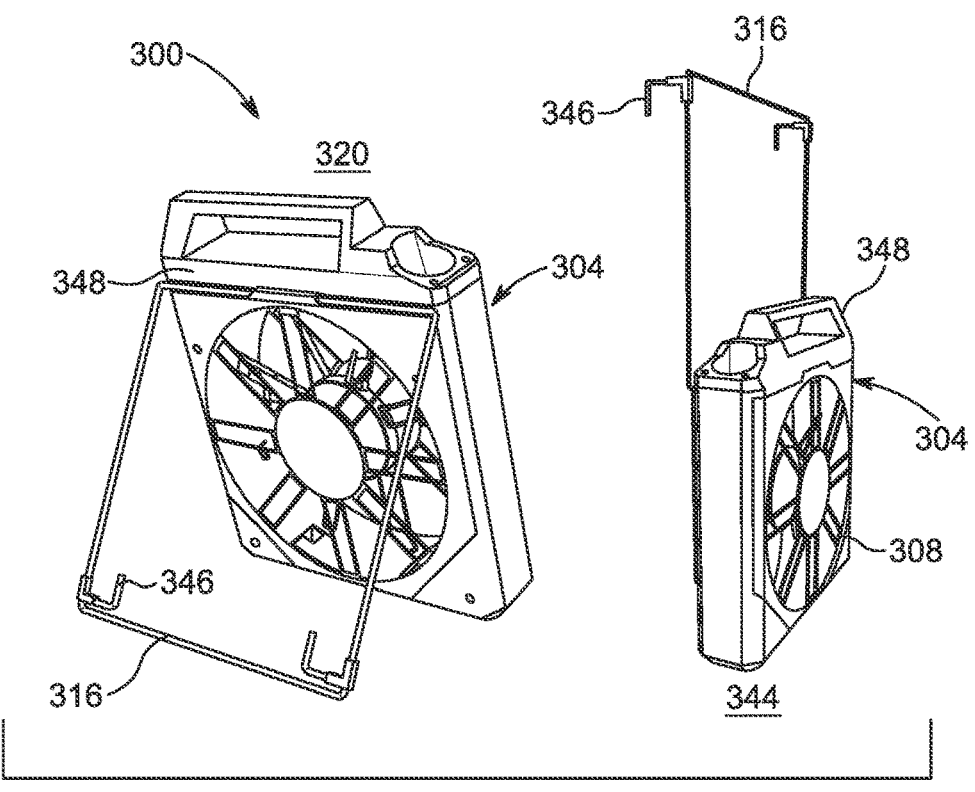
FIG. 10 includes perspective views of a portable fan assembly, according to another embodiment, illustrating the fan assembly in a standing configuration and a hanging configuration.
Figure 11:
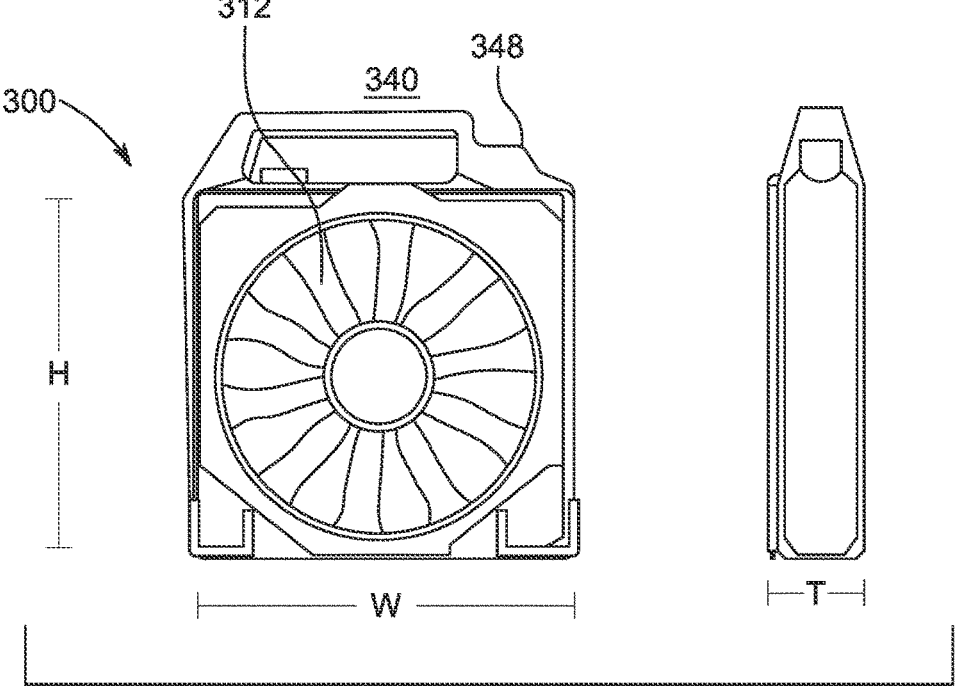
FIG. 11 includes perspective views of the portable fan assembly of FIG. 10, illustrating the fan assembly in a collapsed configuration.
Figure 12:
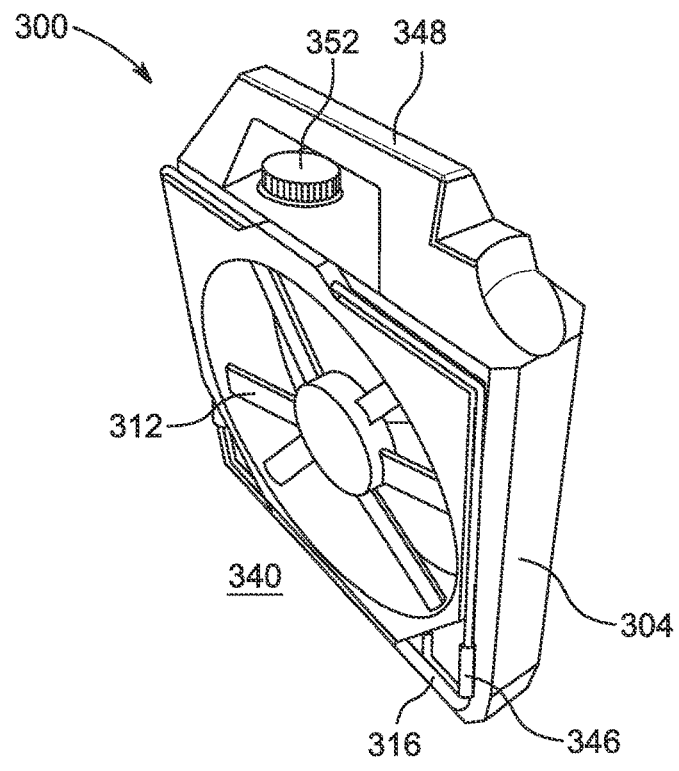
FIG. 12 is another perspective view of the portable fan assembly of FIG. 10 in the collapsed configuration.
Figure 13:
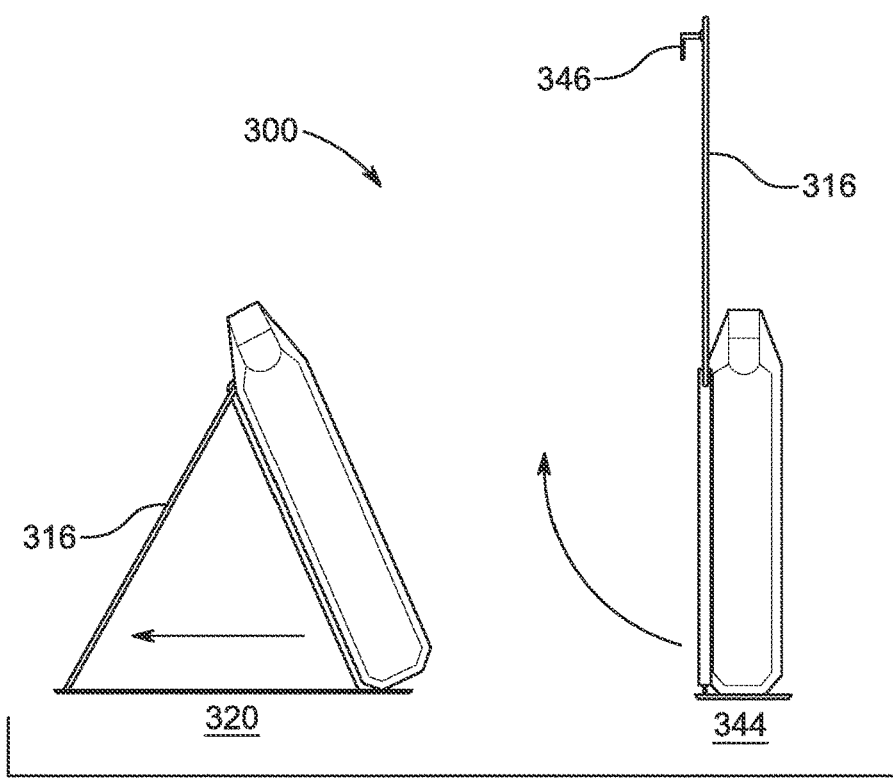
FIG. 13 includes perspective views of the portable fan assembly of FIG. 10, illustrating the fan assembly in the standing configuration and the hanging configuration.

As shown in FIGS. 10 and 13, the support bar 316 allows the fan assembly 300 to be operated and/or stored in multiple configurations including an standing configuration 320 in which the fan assembly 300 is supported on a surface by a portion of the support bar 316 and the housing 304, a collapsed configuration 340 (FIGS. 11 and 12), and a hanging configuration 344 in which the fan assembly 300 may be hung or otherwise supported on a structure by links or hooks 346 formed on the support bar 316 and extending therefrom. In one example, the hooks 346 may support the fan assembly 300 in the hanging configuration in which the hooks 346 at least partially wrap around a beam or plank such as a wooden stud. The hooks 346 may also be rotatably coupled to the support bar 316 such that the hooks 346 may be rotated relative the support bar 316 between collapsed (FIGS. 11 and 12) and extended positions.

The fan assembly 300 may further include handles 348 for accommodating carrying the fan assembly 300, one or more user interfaces 352 for controlling an operational output of the fan assembly 300, and one or more battery packs. In one example construction, the fan assembly 300 may have overall dimensions of 16 inches tall (H), 13.5 inches wide (W), and 3.5 inches deep (D).

Figures 14, 15:
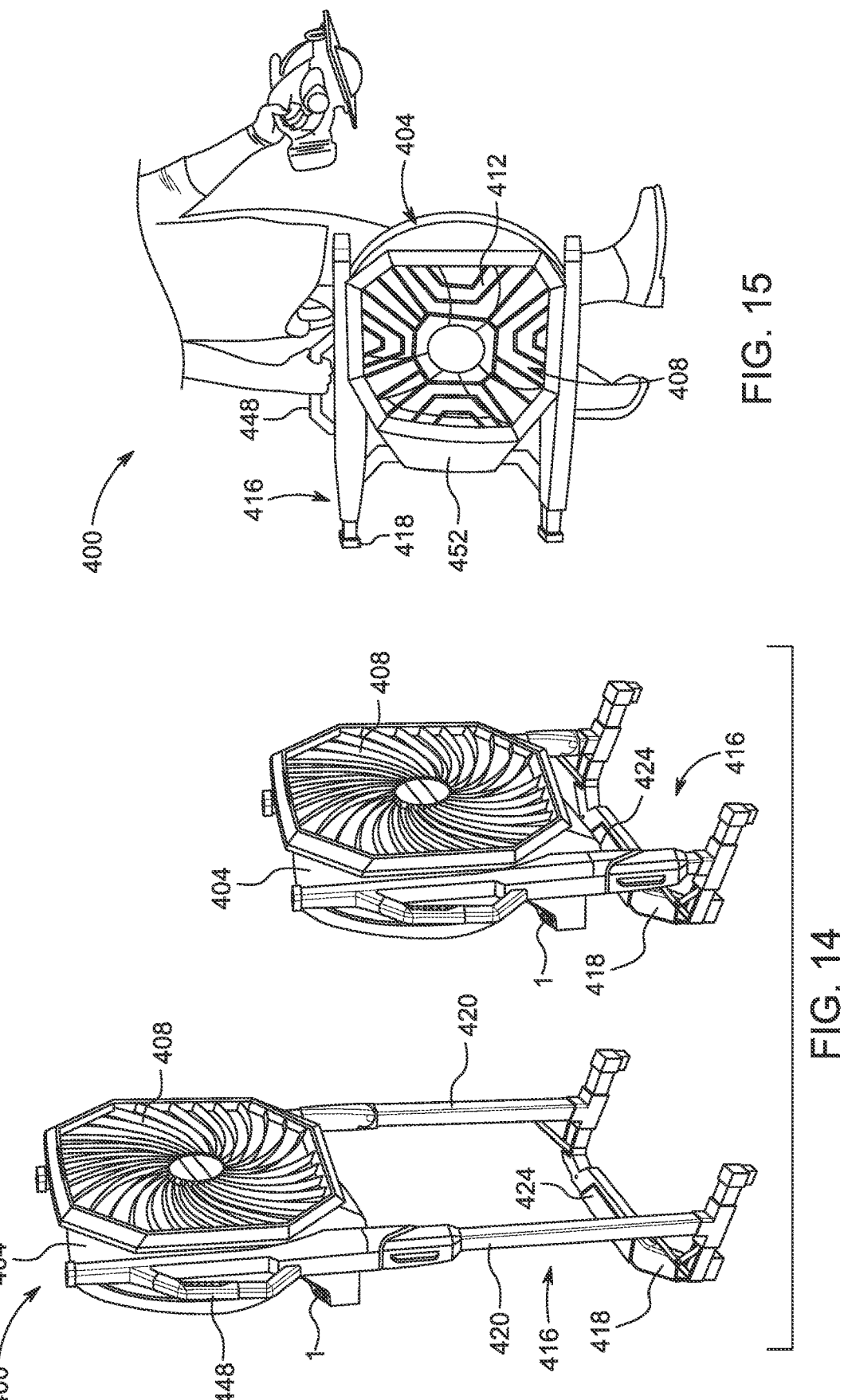
FIG. 14 includes perspective views of a portable fan assembly, according to another embodiment, illustrating the portable fan assembly in multiple extended positions.
FIG. 15 is perspective view of the portable fan assembly of FIG. 14, illustrating the portable fan assembly in a collapsed position.

FIGS. 14 and 15 illustrate a fan assembly 400, such as a portable fan assembly, according to another embodiment. The fan assembly 400 may include a shroud or housing 404, a grille 408, and a fan (e.g., blades) 412 rotatably supported within the housing 404. The housing 404 may by adjustably supported by a base 416 having a support beam 418. The base 416 may include telescoping members 420 that accommodate raising and lowering of the housing 404 relative the support beam 418. In the illustrated embodiment, the support beam 418 may be rotatably or otherwise adjustably attached to the telescoping members 420 between a collapsed position (FIG. 15) and an extended position in which the support beam 418 accommodates standing of the fan assembly 400 on a surface. The fan 412 may be rotated by a battery powered motor or otherwise powered (e.g., wired connection) motor to generate airflow in a desired direction.

In one example construction, the base 416 accommodates height adjustment of the housing 404 to different heights between about twenty inches tall and about fifty inches tall, including twenty inches and fifty inches. In another example construction, the base 416 accommodates height adjustment of the housing 404 to heights above a typical workspace fan such as higher than the height of an average user (e.g., 5 feet 8 inches to 7 feet).

The base 416 may further include a pedal 424 that may be operated by a user to selectively lock and unlock the telescoping members 420 relative to the support beam 418. The pedal 424 may be a foot pedal 424 that is configured to be pressed by a foot of a user. For example, the user may step on the pedal 424 to thereby release the telescoping members 420. The user may then lift the housing 404 to a desired height while maintaining pressure on the pedal 424. Once the user releases the pedal 424, the telescoping members 420 may once again be constrained from movement.

In some embodiments the telescoping members are lift actuated by a spring, hydraulic, plunger, or another type of actuator. In some embodiments, the pedal is biased to a locked position. The fan assembly 400 may further include handles 448 for accommodating carriage of the fan assembly 400, one or more user interfaces 452 (e.g., knobs, buttons, switches, etc.) for controlling an operational output of the fan assembly 400, and one or more battery packs 1 configured to power the motor.

FIGS. 16-19E illustrate a fan assembly 500, such as a portable and battery powered box-type fan assembly, according to another embodiment. The fan assembly 500 includes a fan housing 504, a grille 508, a fan 512 (such as fan impeller, a blade, or a plurality of fan blades) rotatably supported within the fan housing 504, and a base 516. The base 516 is configured to be placed on a support surface (e.g., floor surface, table top, windowsill, etc.) and elevate the fan housing 504 above the support surface to not disturb dust or debris below. The fan housing 504 is rotatably coupled to the base 516 such that the base 516 is operable to support the fan housing 504 in multiple directions, orientations, and/or configurations.

The fan 512 may be rotated by a motor 514 that can be powered by a DC power source (e.g., a power tool battery back), such as the removable battery pack 1, or an AC power source (e.g., a wall outlet). The fan 512 is positioned within an airflow chamber 505 at least partially defined by the fan housing 504. In the illustrated embodiment, the fan 512 is rotated by the motor 514 to generate airflow through the airflow chamber 505. The fan 512 may be rotated by the motor 514 about a rotation axis 506.

The fan assembly 500 further includes a battery receptacle 515 that can receive the removable battery pack 1. In the illustrated embodiment, the battery receptacle 515 is positioned on the fan housing 504. The fan housing 504 may further support an AC power inlet 517 that can provide charging power to the removable battery pack 1 that is received in the battery receptacle 515. In some embodiments, the AC power inlet 517 is positioned on another part of the fan assembly 500, such as the base 516. In either position, the AC power inlet 517 is electrically coupled to the motor 514, to the battery receptacle 515, or to both, such that the motor 514 could be operated on power provided from the battery pack 1 and/or from the AC power inlet 517. An operational output (e.g., speed) of the motor 514 may controlled by a selector 513, such as a rotational knob, a switch, a button, and/or the like.

Figure 16:
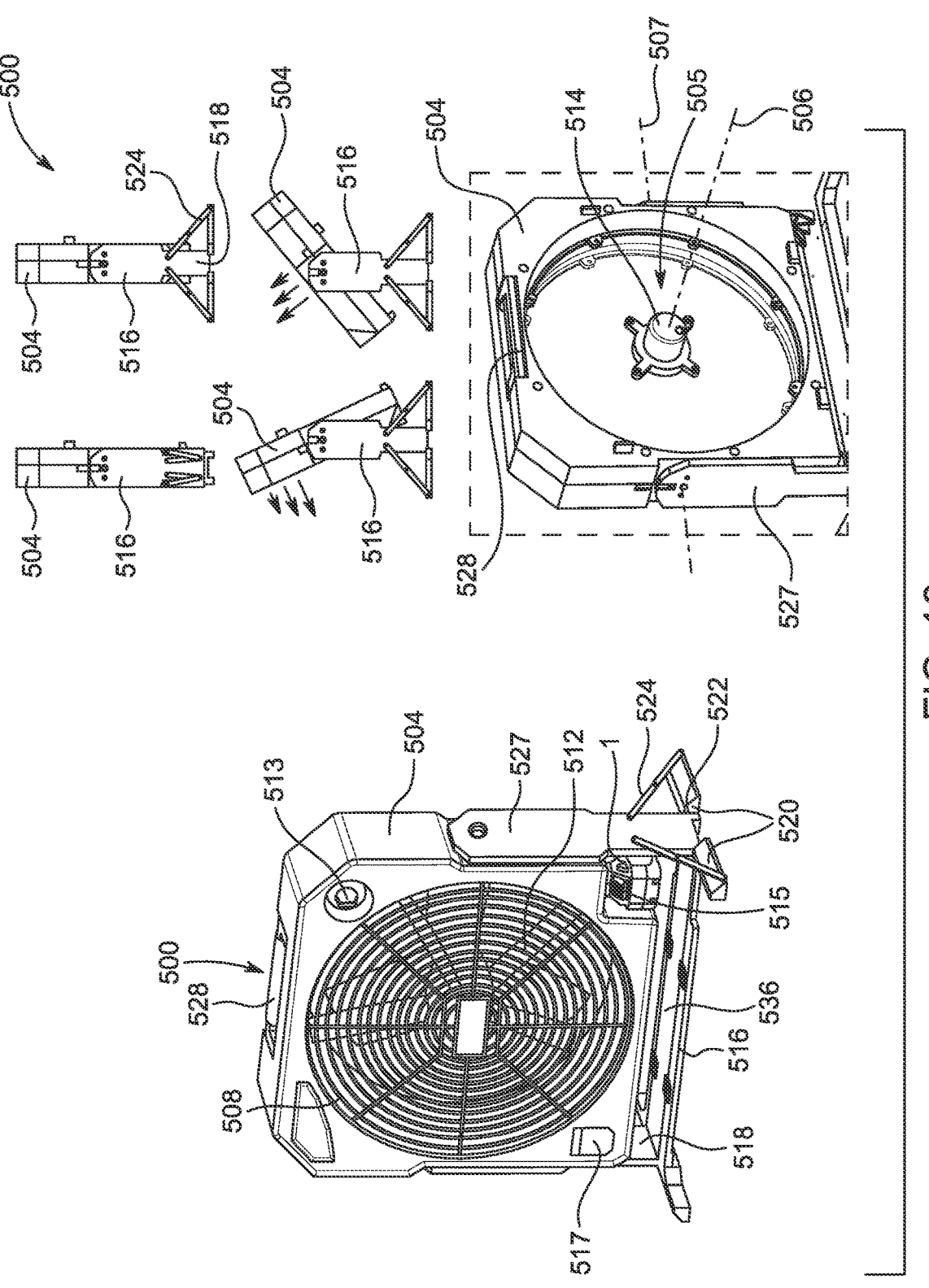
FIG. 16 includes perspective views of a portable fan assembly, according to another embodiment, illustrating the portable fan assembly in multiple configurations.
Figure 17:
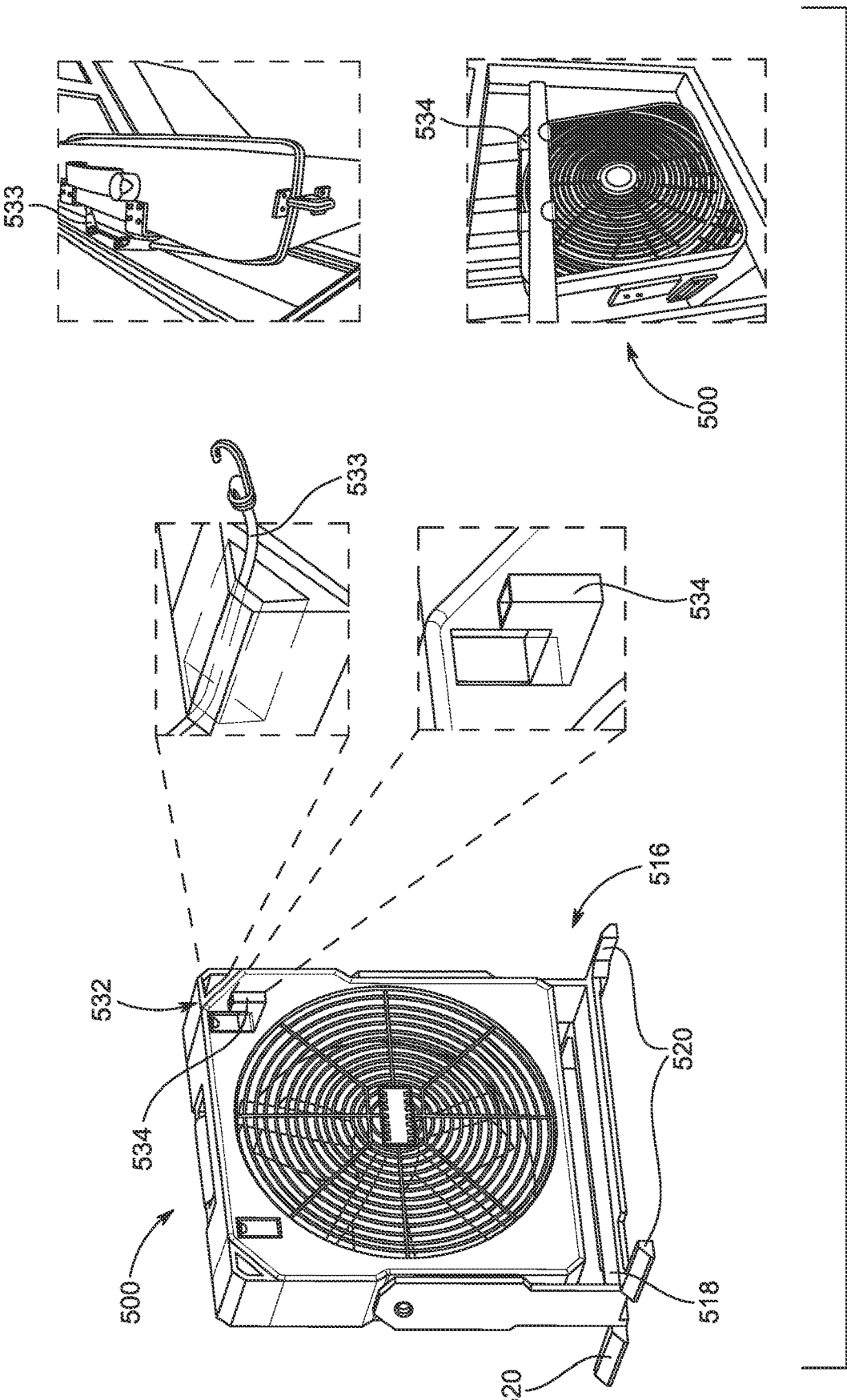
FIG. 17 includes perspective views of the portable fan assembly of FIG. 16, illustrating the portable fan assembly in example applications.
Figure 19A:
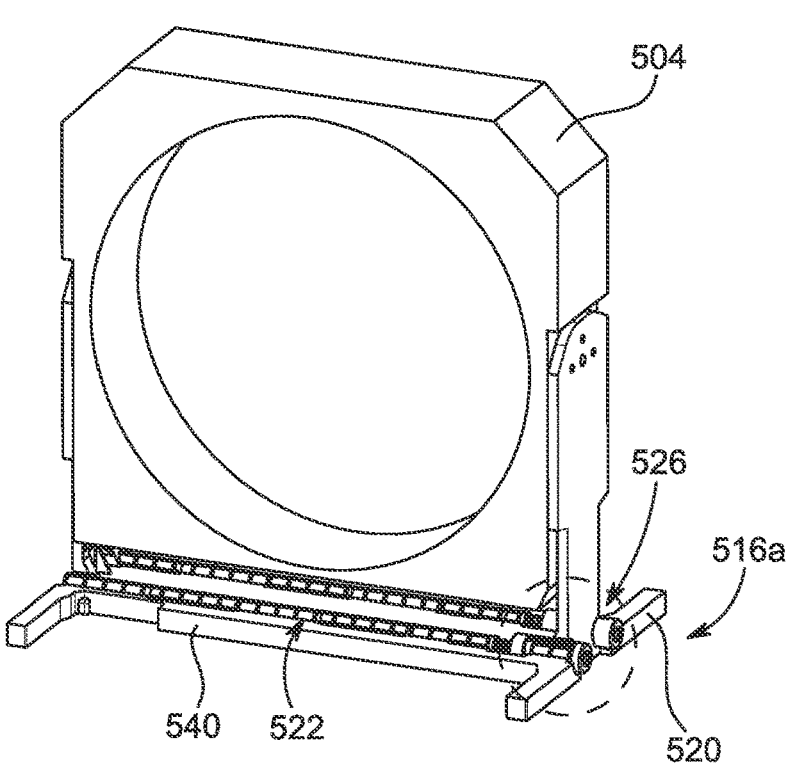
FIG. 19A is a perspective view of a portion of the portable fan assembly of FIG. 18B.

Referring to FIG. 16, the base 516, or frame, includes a stand 518 that supports stabilizing legs 520 to keep the fan housing 504 upright during use. The stabilizing legs 520 fold out or flip-down to provide extra stability in a deployed position, and fold in or flip-up for slender storage and transport in a collapsed position. In the deployed positions, the stabilizing legs 520 are configured to contact the support surface. As shown in FIG. 16, the stabilizing legs 520 may be coupled to the fan housing 504 by hinges 522 such that the stabilizing legs 520 rotate 90 degrees between the deployed and collapsed positions. Brackets 524 may also lock the stabilizing legs 520 in place when deployed. In other embodiments, as illustrated in FIG. 17, the brackets may be omitted. Additionally or alternatively, the hinges 522 may each include a one-way locking detent latch 526, as shown in FIG. 19A and described below. In the illustrated embodiment, a pair of stabilizing legs 520 are positioned on each side of the fan housing 504. In other embodiments, stabilizing legs 520 are positioned on a single side of the fan housing 504.

Figure 18A:
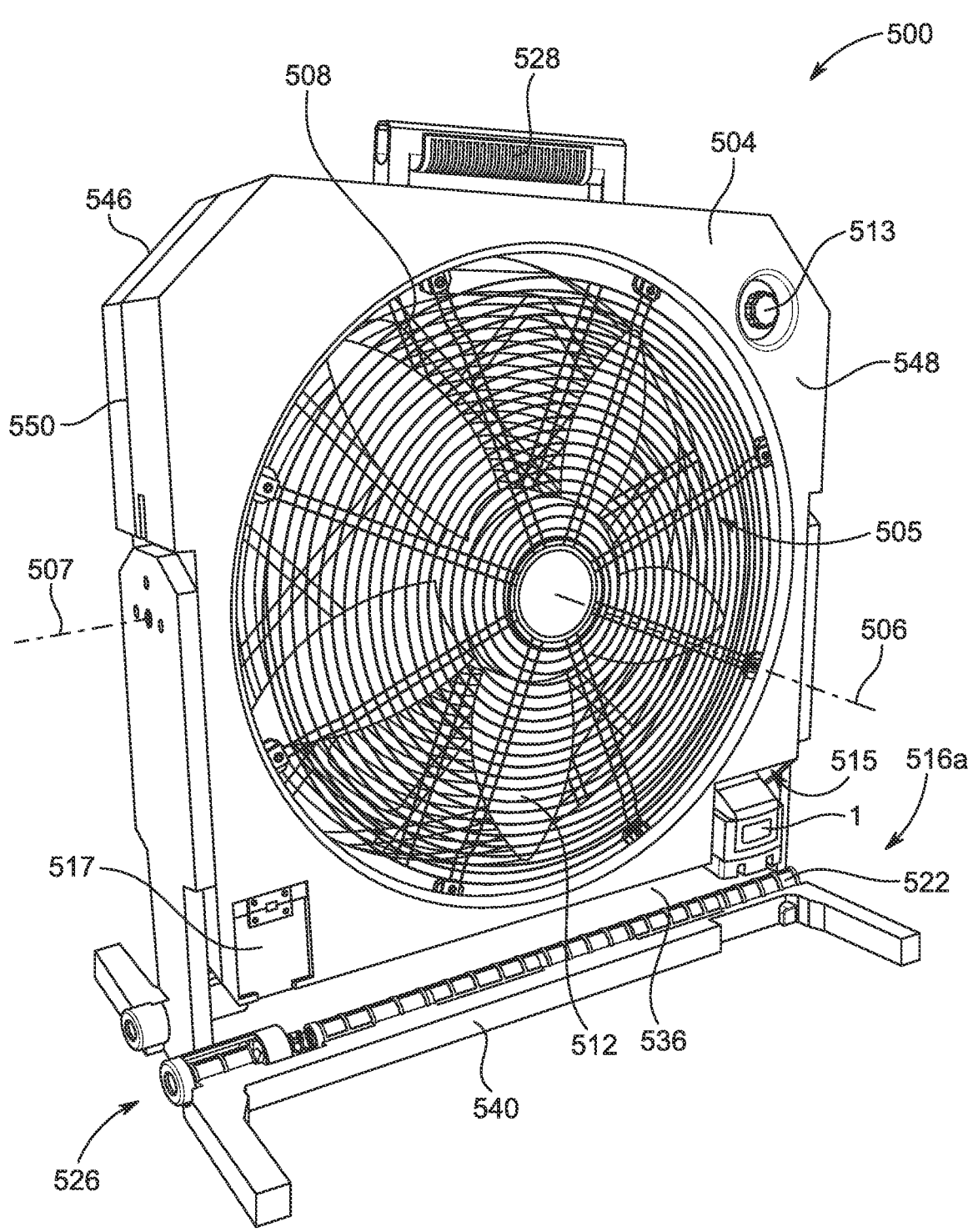
FIG. 18A is a perspective view of the portable fan assembly of FIG. 16, illustrating an alternate base assembly useable with the portable fan assembly.
Figure 18B:
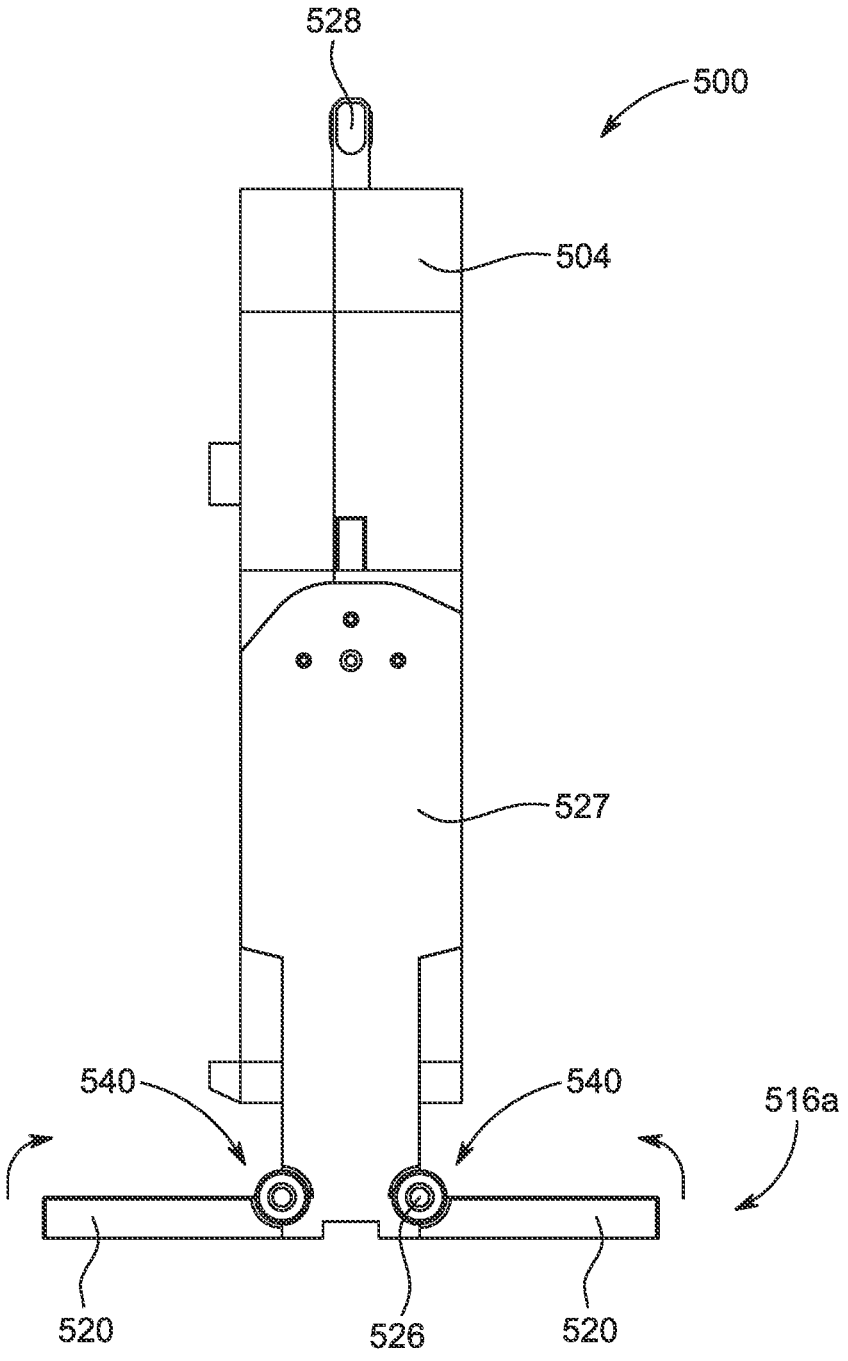
FIG. 18B is a side perspective view of the portable fan assembly of FIG. 18A, illustrating the alternate base in a flipped-down configuration.
Figure 18C:
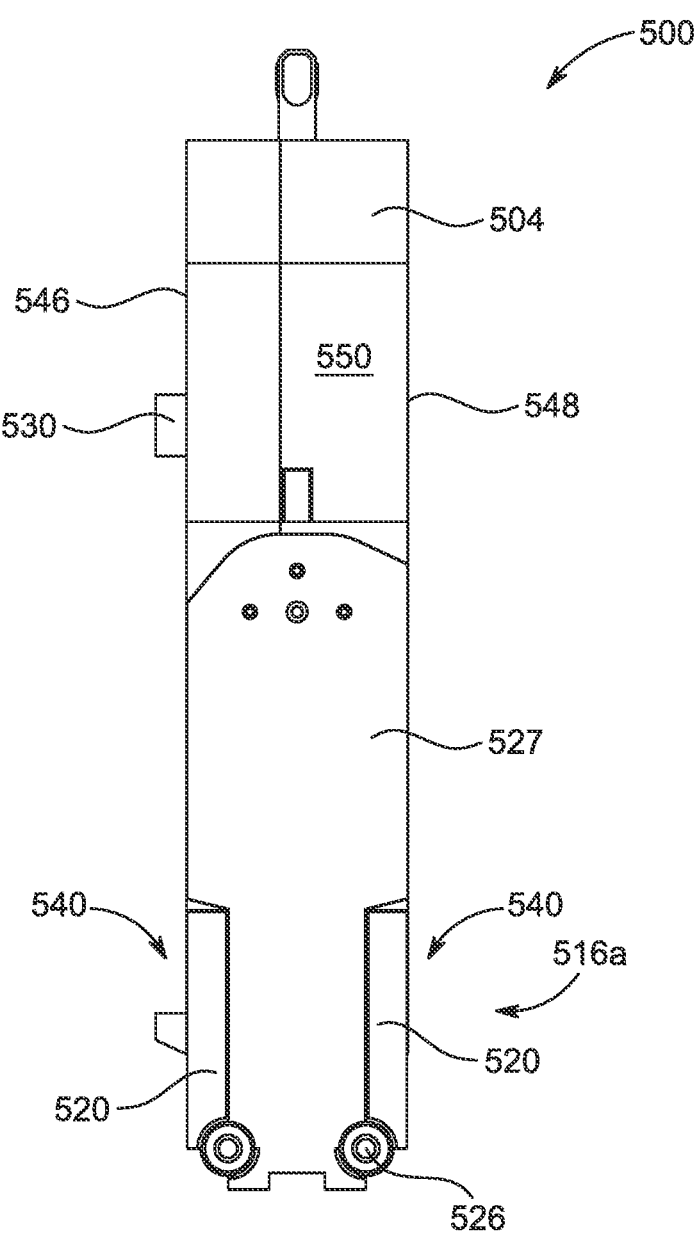
FIG. 18C is a side perspective view of the portable fan assembly of FIG. 18A, illustrating the alternate base in a flipped-up configuration.
Figure 18D:
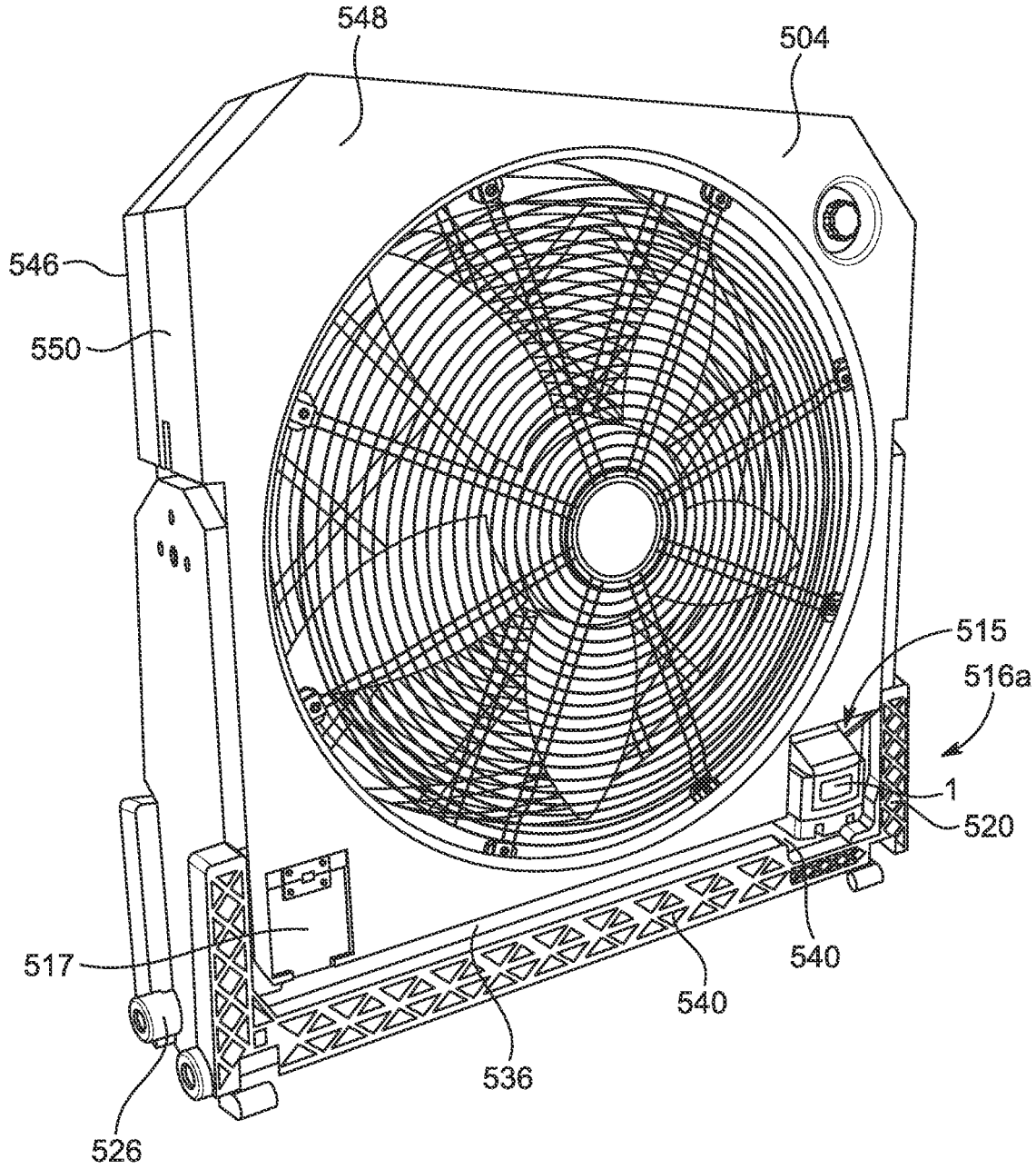
FIG. 18D is a perspective view of FIG. 18C.
Figure 18E:
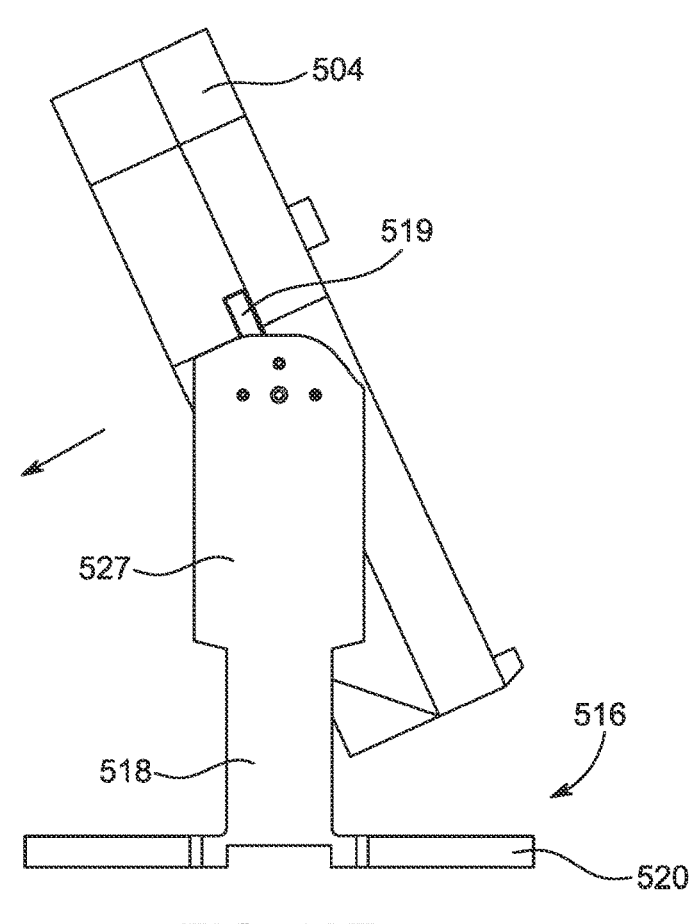
FIG. 18E is a side perspective view of the portable fan assembly of FIG. 18A, illustrating a fan housing in a first orientation.
Figure 18F:
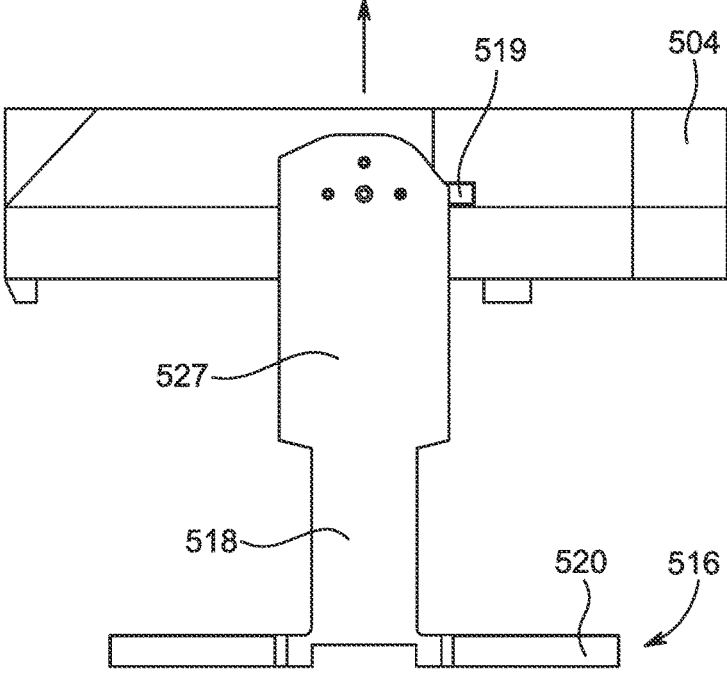
FIG. 18F is a side perspective view of the portable fan assembly of FIG. 18A, illustrating the fan housing in a second orientation.

As shown in FIGS. 16, 18E, and 18F, the fan housing 504 is pivotal (e.g., rotatable) relative to the base 516 about a pivot axis 507 that is parallel to the support surface and perpendicular to the rotation axis 506. The stand 518 may include a body 536 and one or more (e.g., two) arms 527 connected by the body 536. In the illustrated embodiment, the body 536 is elongated along a width of the fan housing 510. The arms 527 may extend upwardly from the body 536 and on diametrically opposite sides of the airflow chamber 505 to support the fan housing 504 through a plurality of directions. For example, the fan housing 504 may rotate to adjust an angle of the fan 512 to alter a direction of the airflow. In some embodiments, the fan housing 504 and/or base 516 may have hard stops 519 (FIGS. 18E and 18F) to inhibit over-rotation relative to each other. For example, the fan housing 504/base 516 may have a first hard stop 519 at a 20 degree downward tilt (FIG. 18E) and a second hard stop 519 at a 50 degree or 90 degree upward tilt (FIG. 18F).

Figure 18G:
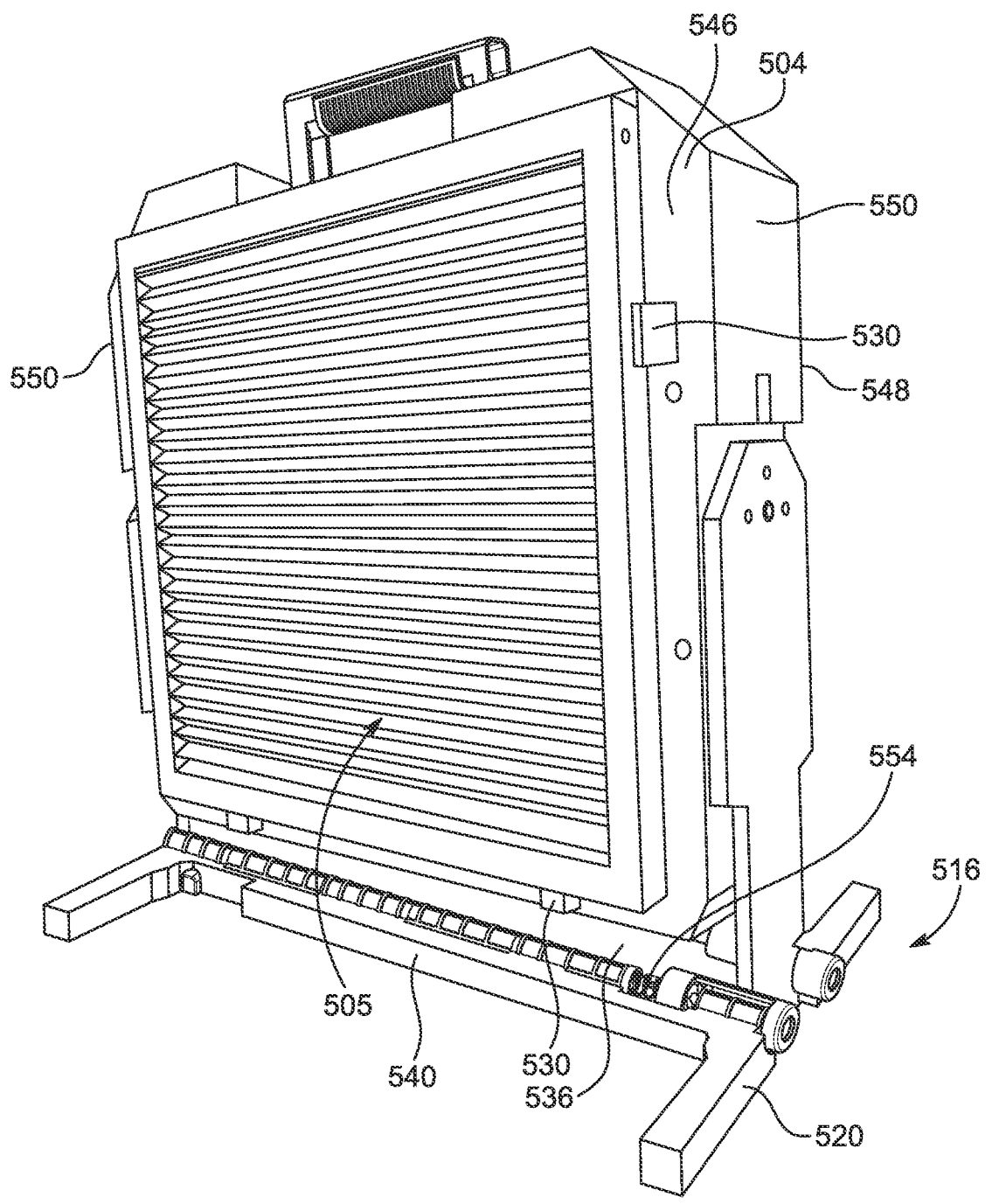
FIG. 18G is a perspective view of the portable fan assembly of FIG. 18B, illustrating a filter.

The fan housing 504 may further include a handle 528. The handle 528 may fold down into the fan housing 504. As illustrated in FIG. 18G, the fan housing 504 may also include retainers 530, such as clips, magnets, tracks, and/or the like, located behind the fan 512. The retainers 530 may allow a standard filter (e.g., a 20 inch×20 inch×1 inch filter) to be releasably held behind the fan 512. In the illustrated embodiment, the filter may be placed adjacent an inlet of the airflow chamber 505.

As shown in FIG. 17, the fan assembly 500 may include mounting features 532 to help mount the fan assembly 500 in a window opening. For example, the fan assembly 500 may include a bungee cord 533 or other suitable cord or cable. Additionally or alternatively, the fan assembly 500 may include a hook 534 or other suitable projection. While mounted in a window opening, a front pair of the stabilizing legs 520 and/or a rear pair of the stabilizing legs 520 may be flipped-up. For example, the rear pair of stabilizing legs 520 may be flipped up, and the fan assembly 500 may be at least partially supported by a frame of the window or another portion of the window. In one instance, the fan assembly 500 could be leaned against a screen or frame within an opening window.

Referring now to FIGS. 18A-19E, the fan housing 504 may be supported by an alternate base 516a that is similar to the base 516 illustrated in FIGS. 16 and 17. The alternate base 516a is coupled to the fan housing 504 and is placed on the support surface and includes a body 536 that elevates the fan housing 504 above the support surface. The alternate base 516a and body 536 are also operable to support the fan housing 504 in multiple configurations, orientations, directions, etc. The alternate base 516a further includes a stand 540 movable relative to the body 536 and the one-way locking detent latch 526, which is coupled to the body 536 and to the stand 540. The detent latch 526 releasably secures a position of the stand 540 relative to the body 536 and is operable (e.g., by a user) to allow movement of the stand 540 relative to the body 536. The detent latch 526 is further positioned adjacent at least one of the hinges 522.

As specifically illustrated in FIGS. 18A-18G, the fan housing 504 has a first face 546, a second face 548 opposite the first face 546, and a perimeter extending between the first face 546 and the second face 548. In other words, the perimeter is made up of the plurality of faces 550 extending between the first face 546 and the second face 548. In the illustrated embodiment, the perimeter is polygonal (e.g., rectangular, square, hexagonal, etc.) but could be circular in other embodiments. In the illustrated embodiment, a perimeter of the airflow chamber 505 is circular, but could be polygonal in other embodiments.

The first face 546, the second face 548, and the plurality of faces 550 (e.g. the perimeter) together define a volume therebetween. In the illustrated embodiment, the battery receptacle 515 is positioned within the volume adjacent the second face 548 of the fan housing 504. In the illustrated embodiment, the first face 546 includes the retainers 530 for the replaceable filter. Referring specifically to FIG. 18A, the battery receptacle 515 is positioned adjacent a vertex of two side faces (e.g., faces 550) and below both the rotation axis 506 and the pivot axis 507. The position of the battery receptacle 515 on the fan housing 504 provides additional support to the fan assembly 500 while the battery pack 1 is received in the battery receptacle 515. In some instances, the position of the battery receptacle 515 makes movement of the fan housing 504 easier for the user and resists the fan housing 504 from being flipped over.

Figure 19B:
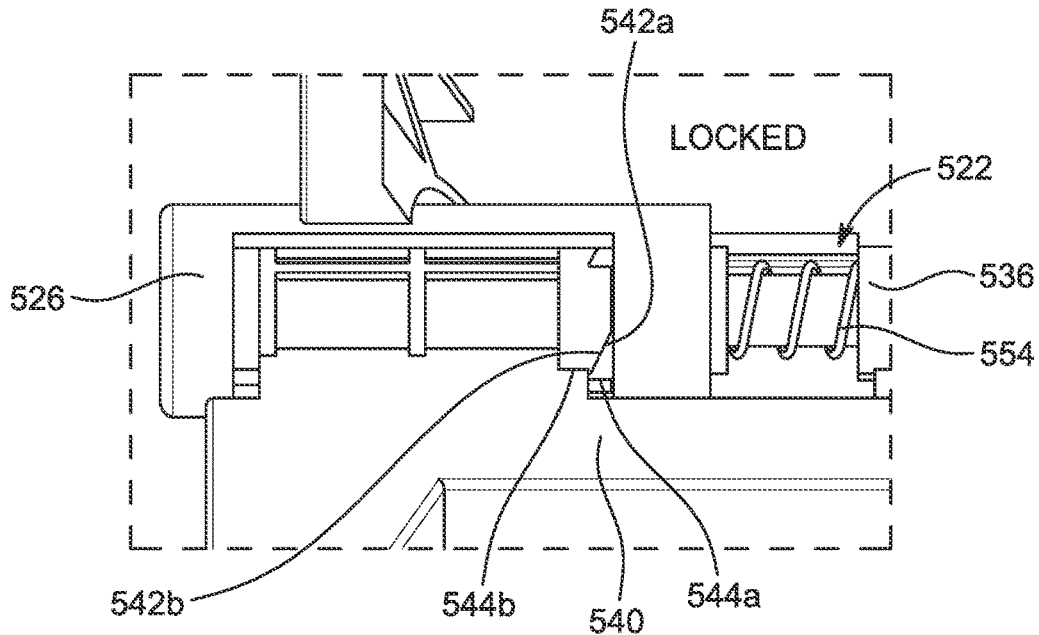
FIG. 19B is an isolated perspective view of a latch portion of the portable fan assembly of FIG. 19A, illustrating a latch in a locked position.
Figure 19C:
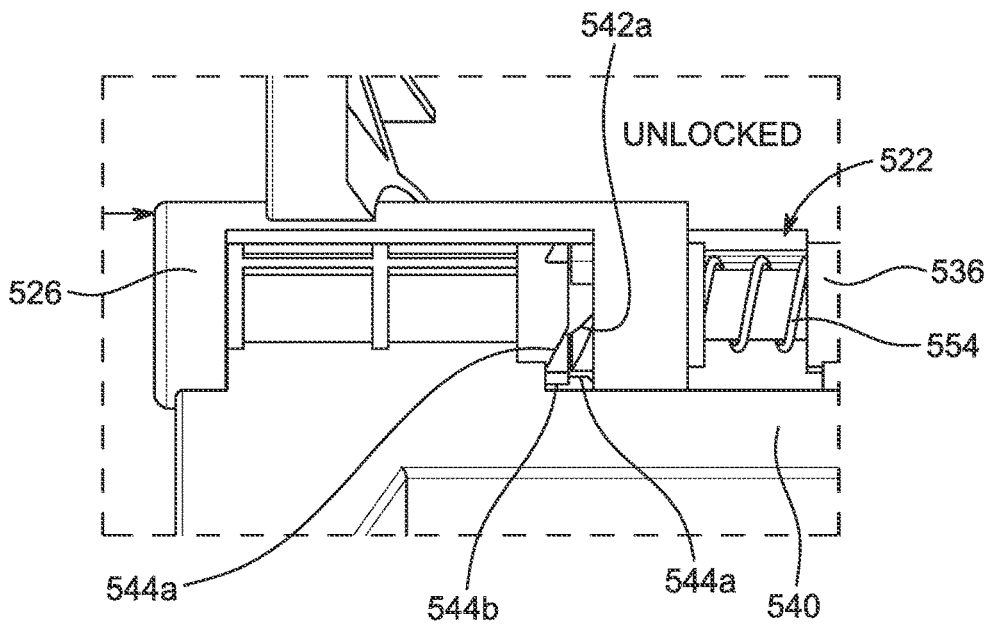
FIG. 19C is an isolated perspective view of the latch portion of the portable fan assembly of FIG. 19A, illustrating the latch in an unlocked position.
Figure 19D:
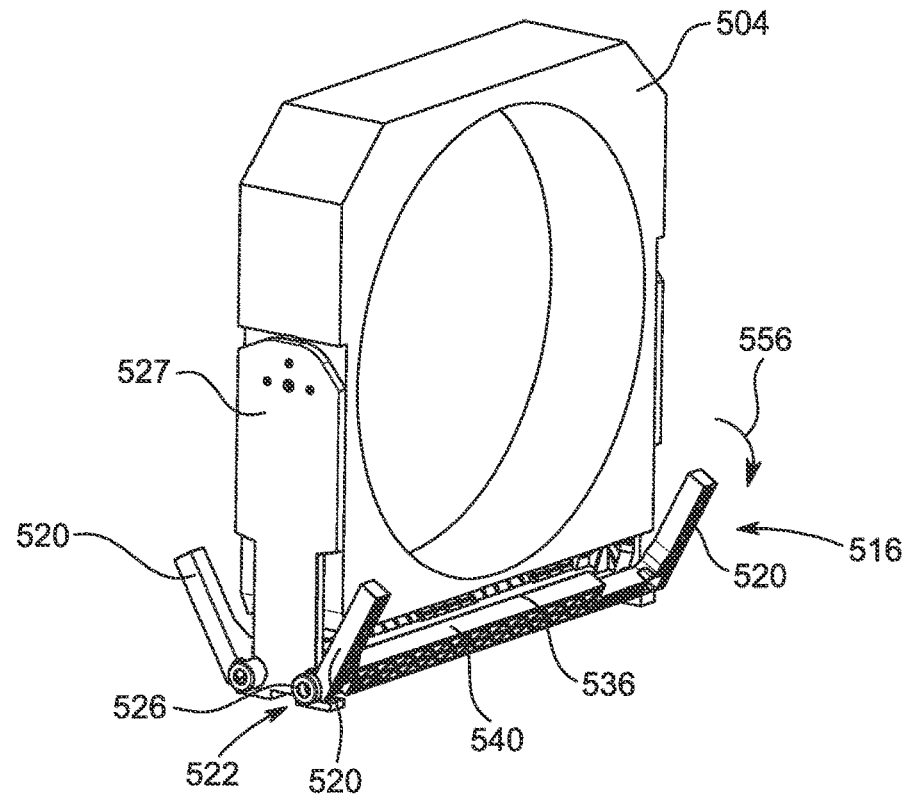
FIG. 19D is a perspective view of the portable fan assembly of FIG. 19A, illustrating the base in an intermediate position.

In the illustrated embodiment, as illustrated in FIGS. 19B and 19C, the detent latch 526 includes a plurality of ramps 542a each terminated by a shoulder 544a. The stand 540 includes complementary ramps 542b and shoulders 544b that are radially offset relative the ramps 542a and the shoulders 544a such that the detent latch 526 and the stand 540 cooperate with one another in a one-way ratchet manner. As such the detent latch 526 includes a ratchet mechanism that has a series of ramps 542a and shoulders 544a that contact the complementary series of ramps 542b and shoulders 544b formed on the stand 540 to permit ratcheting rotation of the stand 540 relative to the body 536.

As further illustrated in FIGS. 19B and 19C, the stand 540 may be rotatably coupled to the body 536 with the hinge 522, which may be an elongated hinge that extends along the width of the fan housing 504 between the diametrically opposite sides of the fan housing 504. The hinge 522 may also attach a single pair of stabilizing legs 520 together. The detent latch 526 may be biased by a biasing member 554 (e.g., spring) and moveable axially along a portion of the hinge 522. The biasing member 554 may bias the detent latch 526 into a locked position (FIG. 19B) in which the stand 540 is moveable relative the body 536 in a first direction or flip-down direction 556 (arrow in FIG. 19D) but inhibited from flipping up by contact between the shoulders 544a on the detent latch 526 and the shoulders 544b on the stand 540. As the stand 540 moves in the flip-down direction 556, the ramps 542a, 542b engage and slide on one another. As the ramps 542a, 542b slide, the biasing member 554 is engaged and allows the detent latch 526 to slide until the 542a, 542b clear one another and the shoulders 544a, 544b slide into engagement with one another, in which the detent latch 526 will prevent movement of the stand 540 in the opposing flip-up direction.

Figure 19E:
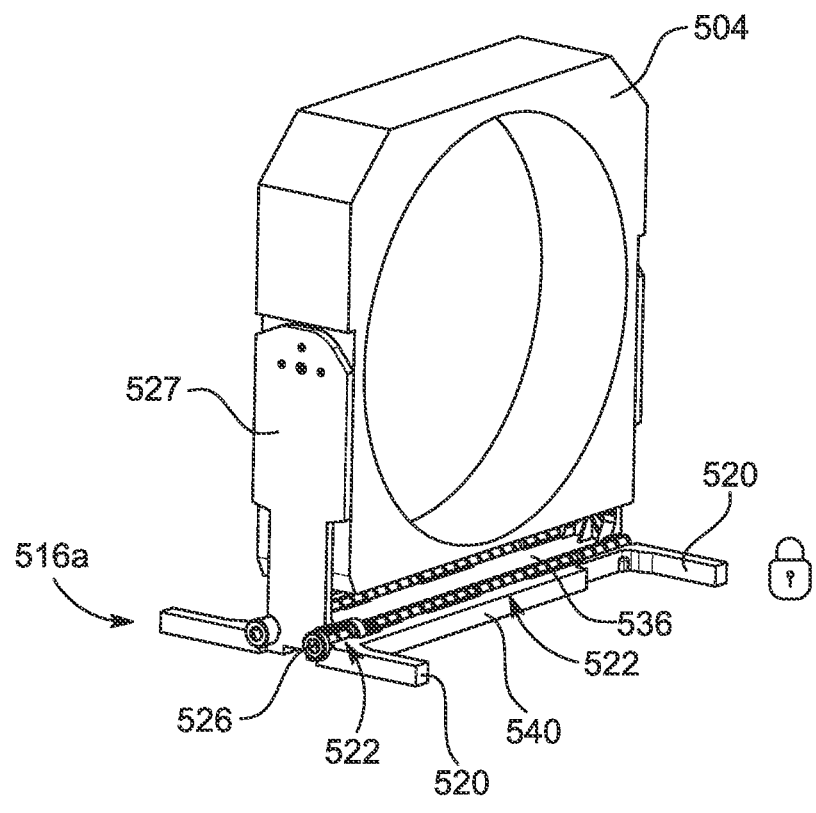
FIG. 19E is a perspective view of the portable fan assembly of FIG. 19A, illustrating the base locked in a flipped-down position.

Once the stand 540 is flipped down so that the stabilizing legs 520 are parallel with the support surface, as illustrated in FIGS. 18B and 19E, the detent latch 526 is actuated, such as by the hand or foot of a user, to separate the shoulders 544a, 544b from one another, and allow the stand 540 to be flipped up (e.g., from the deployed position toward the collapsed position). In some embodiments, the alternate base 516a includes a stand 540 on each side of the fan housing 504, and each stand 540 is moveable independently from the other. In such embodiments, the fan assembly 500 includes a detent latch 526 on each stand 540.

FIGS. 20A-21G illustrate a fan assembly 600, such as a portable fan assembly, according to another embodiment. The fan assembly 600 includes a fan housing 604, a grille 608, a fan 612 rotatably supported within the fan housing 604, and a base assembly or base 616. The fan 612 may be or include an impeller, a blade, a plurality of blades, or the like, and may be rotated by motor 614 powered by a DC power source, such as the battery pack 1, or an AC power source (e.g., a wall outlet). The fan 612 may be supported by the fan housing 604 within an airflow chamber at least partially defined by the fan housing 604. FIGS. 20A-20E illustrate a base 616 useable with the fan housing 604, and FIGS. 21A-21F illustrated an alternate base 616a useable with the fan housing 604 or a slightly modified fan housing.

The base 616 and the alternate base 616a are configured to be placed on a support surface (e.g., floor surface, table top, windowsill, etc.) and elevate the fan housing 604 above the support surface to not disturb dust or debris below. The fan housing 604 is rotatably coupled to the base 616 and the alternate base 616a such that the base 616 and the alternate base 616a are operable to support the fan housing 604 in multiple directions, orientations, and/or configurations. The fan 612 is positioned within an airflow chamber 605 at least partially defined by the fan housing 604. In the illustrated embodiment, the fan 612 is rotated by the motor 614 to generate airflow through the airflow chamber 605. The fan 612 may be rotated by the motor 614 about a rotation axis 606.

The fan assembly 600 further includes a battery receptacle 615 that can receive the removable battery pack 1. In the illustrated embodiment of FIGS. 20A-20E, the battery receptacle 615 is positioned on the fan housing 604. In the illustrated embodiment of FIGS. 21A-21G, the battery receptacle 615 is positioned on the alternate base 616a. The fan housing 604 and/or the alternate base 616a may further support an AC power inlet 617 that can provide charging power to the removable battery pack 1 that is received in the battery receptacle 615. In some embodiments, the AC power inlet 617 is positioned on another part of the fan assembly 600, such as the base 616. In either position, the AC power inlet 617 is electrically coupled to the motor 614, to the battery receptacle 615, or to both, such that the motor 614 could be operated on power provided from the battery pack 1 and/or from the AC power inlet 617.

The base 616, or frame, includes a first frame segment 618a having a first end 619 and an opposite second end 620, a second frame segment 618b having a first end 621 and a second end 622, and a third frame segment 618c having a first end 623 and a second end 624. Each of the illustrated frame segments 618a, 618b, 618c includes two parallel, spaced apart beams or members. In other embodiments, each frame segment 618a, 618b, 618c may only include a single beam or member. The first frame segment 618a can be pivotally coupled to the second frame segment 618b, and the second frame segment 618b may be pivotally coupled to the third frame segment 618c. The first frame segment 618a, the second frame segment 618b, and the third frame segment 618c may be expanded (e.g., unfolded) into a plurality of deployed configurations (FIGS. 20A and 20E) and collapsed (e.g., folded, folded down, etc.) into a compact form or storage configuration (FIG. 20C). The fan housing 604 may rotate or pivot relative to the base 616. For example, the fan housing 604 may rotate 360 degrees relative to the base 616. In some embodiments, rotation of the fan housing 604 may be limited to 320 degrees. In the illustrated embodiment, the fan housing 604 is coupled to the first frame segment 618a, but could be alternately coupled to other portions of the base 616.

Figures 20E, 21A:
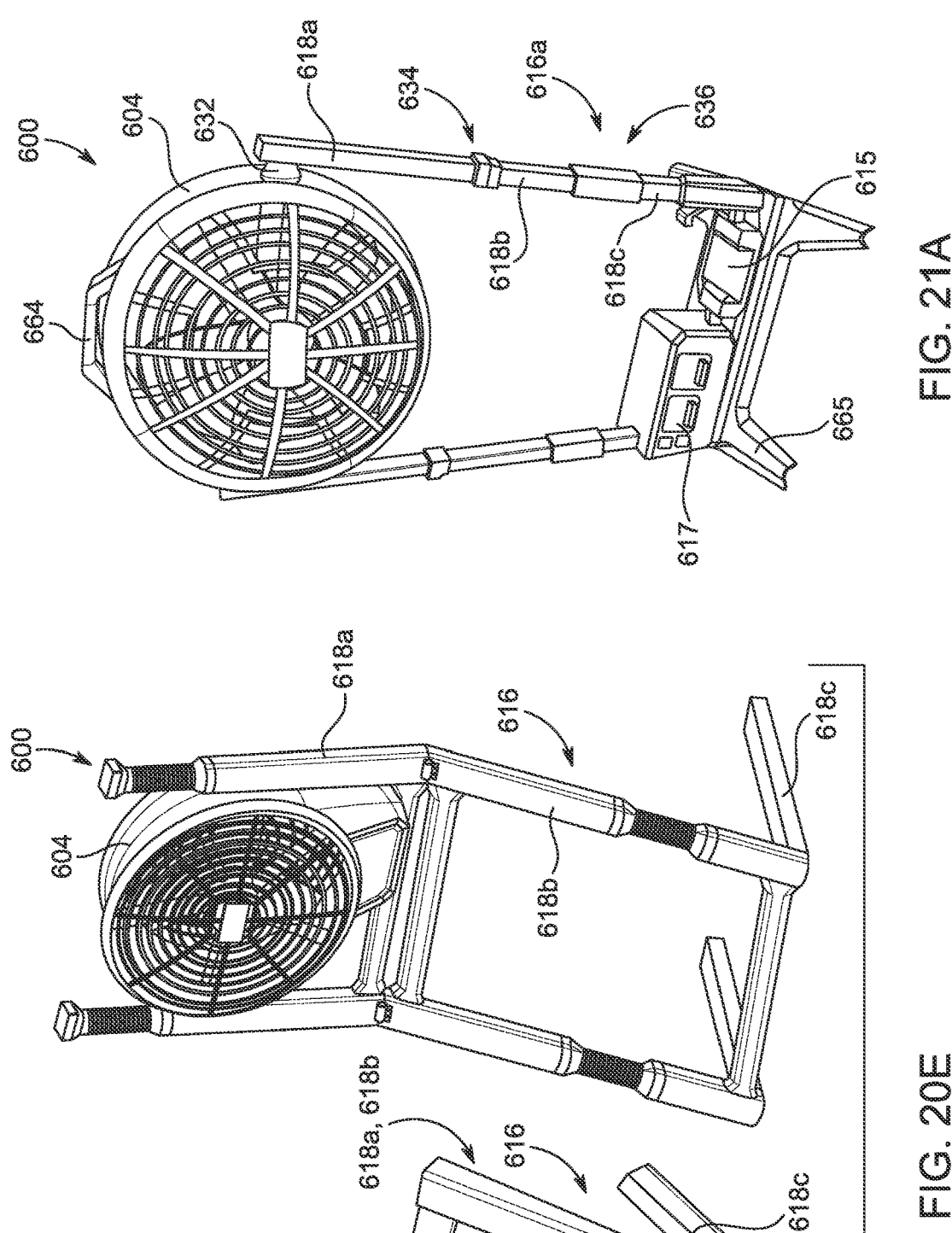
FIG. 20E includes perspective views of the portable fan assembly of FIG. 20A, illustrating the portable fan assembly in example deployed configurations.
FIG. 21A is a perspective view of a portable fan assembly, according to another embodiment.

The base 616 may elevate the fan housing 604, for example, 15 inches, 32 inches, or 42 inches off the ground when in either of the deployed configurations. As illustrated in FIG. 20E, the base 616 is expandable into a first deployed configuration (left view of FIG. 20E) in which the first frame segment 618a is folded on the second frame segment 618b, the second frame segment 618b is unfolded from the third frame segment 618c, and the fan housing 604 is elevated above the support surface by a first height between approximately ten inches and approximately twenty inches (e.g., 15 inches). As also illustrated in FIG. 20E, the base 616 is expandable into a second deployed configuration (right view of FIG. 20E) in which the first frame segment 618a is unfolded from the second frame segment 618b, the second frame segment 618b is unfolded from the third frame segment 618c, and the fan housing 604 is elevated above the support surface by a second height between approximately thirty inches and approximately fifty inches (e.g., 32 inches, 42 inches, etc.). In other deployed configurations, the first frame segment 618a, the second frame segment 618b, and the third frame segment 618c may be expanded into different configurations to achieve different heights of the fan housing 604.

Figure 20A:
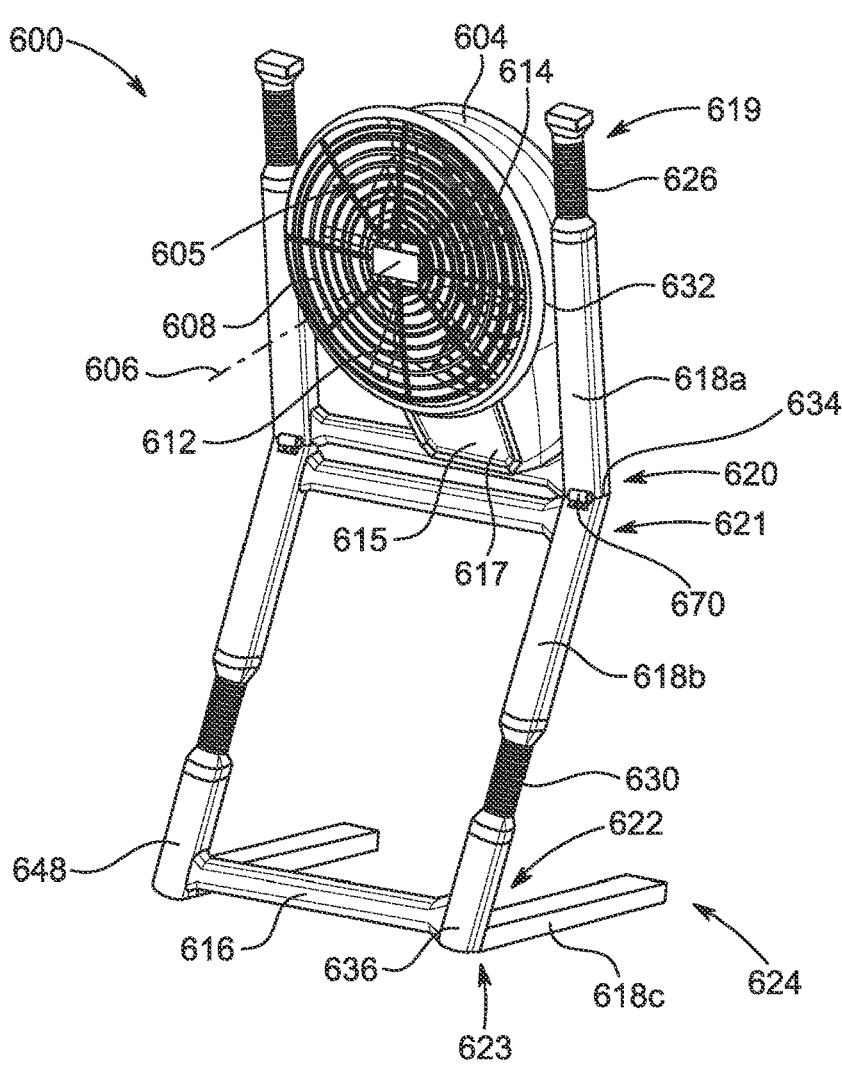
FIG. 20A is a perspective view of a portable fan assembly, according to another embodiment.
Figure 20B:
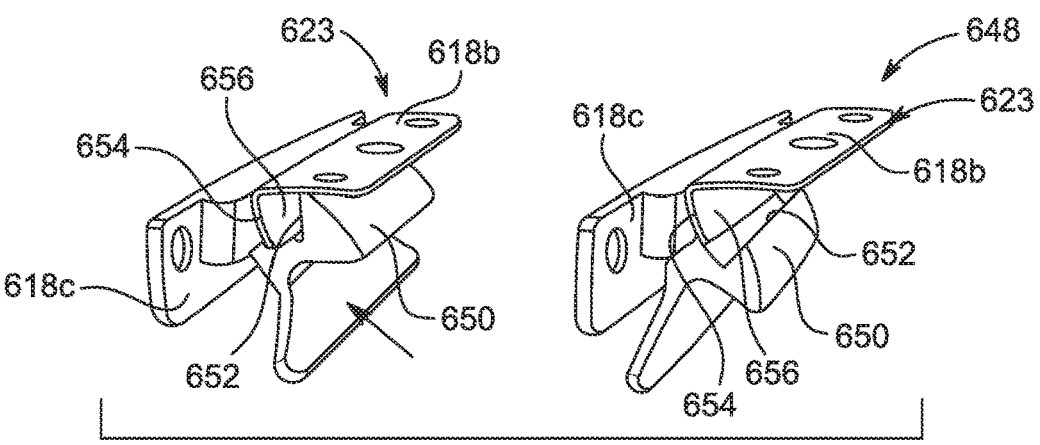
FIG. 20B is a perspective view of a self-locking latch of the portable fan assembly of FIG. 20A.
Figures 20C, 20D:
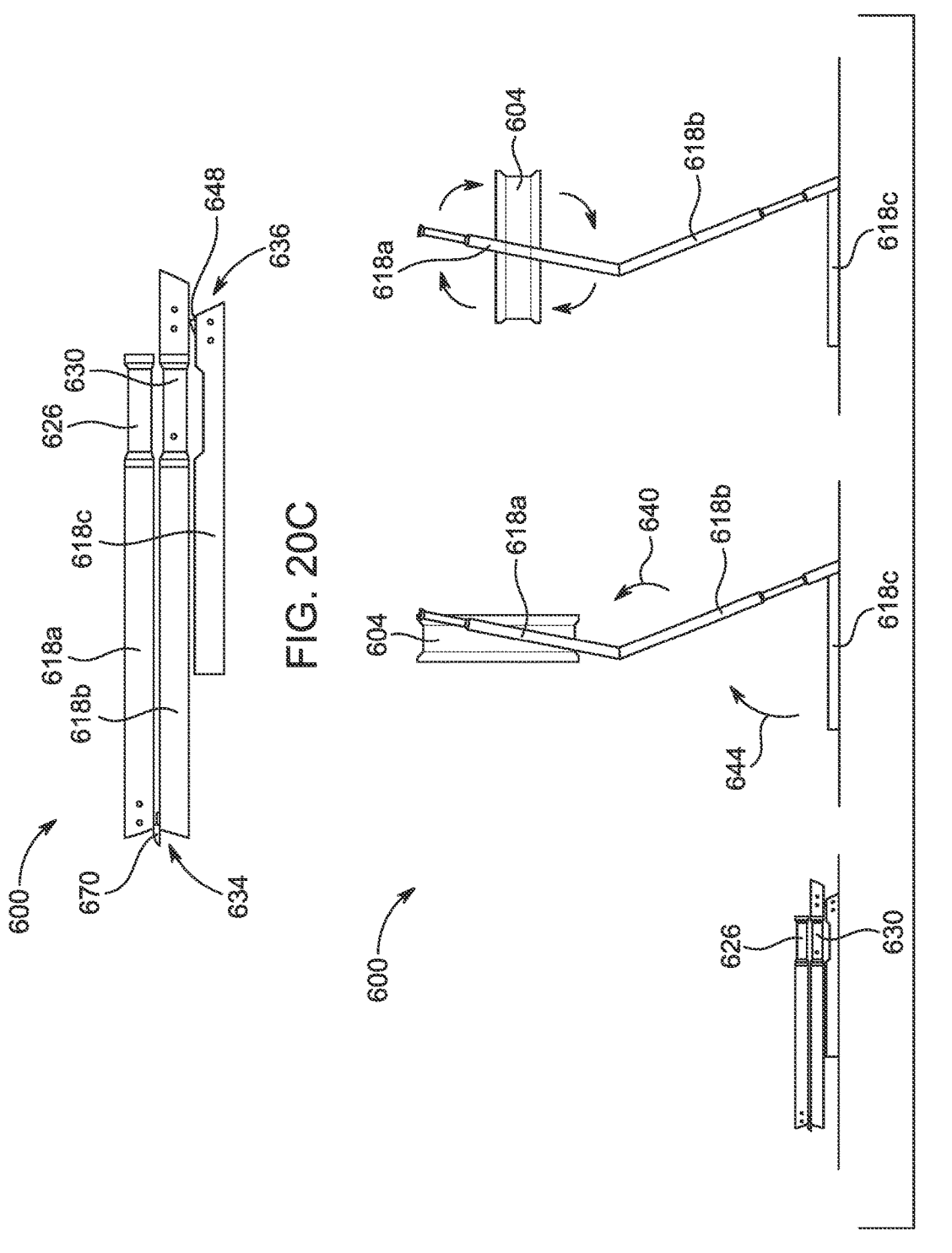
FIG. 20C is a side view of the portable fan assembly of FIG. 20A, illustrating the portable fan assembly in a collapsed configuration.
FIG. 20D includes side perspective views of the portable fan assembly of FIG. 20A, illustrating the portable fan assembly in the collapsed configuration and in a deployed configuration.

As best illustrated in FIGS. 20A and 20C, the first frame segment 618a may include a first gripping portion 626 and the second frame segment 618b may include a second gripping portion 630. The first gripping portion 626 and the second gripping portion 630 may be reduced in size relative to the adjacent portions of the base 616 and may aid in the set-up and adjustment of the fan assembly 600. The first gripping portion 626 and the second gripping portion 630 may include abrasive or textured surfaces. As shown in FIG. 20C, the first gripping portion 626 and the second gripping portion 630 may be adjacent one another while the base 616 is collapsed into the storage configuration to provide a relief space for a user to grasp when unfolding or deploying the base 616. For example, when the first gripping portion 626 and the second gripping portion 630 are adjacent to one another, a user may fit their fingers into the relief space provided to grasp the base 616.

Referring now to FIG. 20D, the base 616 further includes a first joint 632 connecting the fan housing 604 and the first frame segment 618a, a second joint 634 connecting the first frame segment 618a and the second frame segment 618b, and a third joint 636 connecting the second frame segment 618b to the third frame segment 618c. In the illustrated embodiment, the first joint 632 is positioned between the first end 619 and the second end 620 of the first frame segment 618a, the second joint 634 is positioned at the first end 623 of the second frame segment 618b, and the third joint 636 is positioned at the second end 624 of the second frame segment 618b. In some embodiments, the joints are positioned on other parts of the frame segments.

With continued reference to FIG. 20D, the second frame segment 618b is pivotal toward the storage configuration relative to the third frame segment 618c in a first direction 640, and the first frame segment 618a is pivotal toward the storage configuration relative to the second frame segment 618b in a second direction 644. In the illustrated embodiment, the first direction 640 and the second direction 644 are opposite to one another, but could be generally similar to one another in other embodiments.

Referring now to FIGS. 20A and 20B, the fan assembly 600 further includes a latch or self-locking latch 648 positioned between the second frame segment 618b and the third frame segment 618c. In some embodiments, the third joint 636 includes the self-locking latch 648. In the illustrated embodiment, the self-locking latch 648 is biased into a locked position (left view of FIG. 20B) in which the self-locking latch 648 inhibits relative movement between the second frame segment 618b and the third frame segment 618c. The during deployment of the fan assembly 600, the second frame segment 618b is moveable relative to the third frame segment 618c without the user needing to operate the self-locking latch 648. The self-locking latch 648 has a ramp 650 and a shoulder 652 that are engaged by a ramp 654 and a shoulder 656 on the first end 623 of the second frame segment 618b. The ramp 654 of the second frame segment 618*b* displaces the ramp 650 of the self-locking latch 648 as the second frame segment 618*b* is pivoted into the deployed condition.

Once the ramp 654 of the second frame segment 618*b* clears the ramp 650 of the self-locking latch 648, the shoulder 652 of the self-locking latch 648 bears against the shoulder 656 of the second frame segment 618*b* to prevent relative pivoting between the two. While locked, the self-locking latch 648 may be operated (e.g., by the hand or foot of a user) into an unlocked or unlatched positioned (right view of FIG. 20B) to allow relative pivoting between the second frame segment 618*b* and the third frame segment 618*c*. The fan assembly 600 may even further include a hinge or friction hinge 670 positioned between the first frame segment 618*a* and the second frame segment 618*b*. The friction hinge 670 is configured to inhibit the first frame segment 618*a* and the second frame segment 618*b* from swinging (e.g., pivoting) freely from one another. Stated another way, the friction hinge 670 internal pin or slide mechanisms to resist movement withing the second joint 634. The friction hinge 670 may also be positioned in the first joint 632 and/or the third joint 636. In general, the self-locking latch 648 or latches and the friction hinge 670 or hinges may keep the base 616 upright and locked while in use.

As illustrate in FIG. 21A, the fan assembly 600 may even further include a handle or carrying handle 664 supported on at least one of the fan housing 604 and the alternate base 616*a*. In the illustrated embodiment, the carrying handle 664 is configured to accommodate carrying of the fan assembly 600 in any of the storage configuration, the first deployed configuration, and the second deployed configuration. With further reference to FIG. 21A, the first frame segment 618*a*, the second frame segment 618*b*, and the third frame segment 618*c* of the alternate base 616*a* may be telescopically connected to one another such that the second joint 634 and the third joint 636 are sliding joints rather than pivoting joints. In the illustrated embodiment, pivoting or sliding joints may include friction hinges and/or self-locking latched.

Figures 21B, 21C, 21D, 21E, 21F:
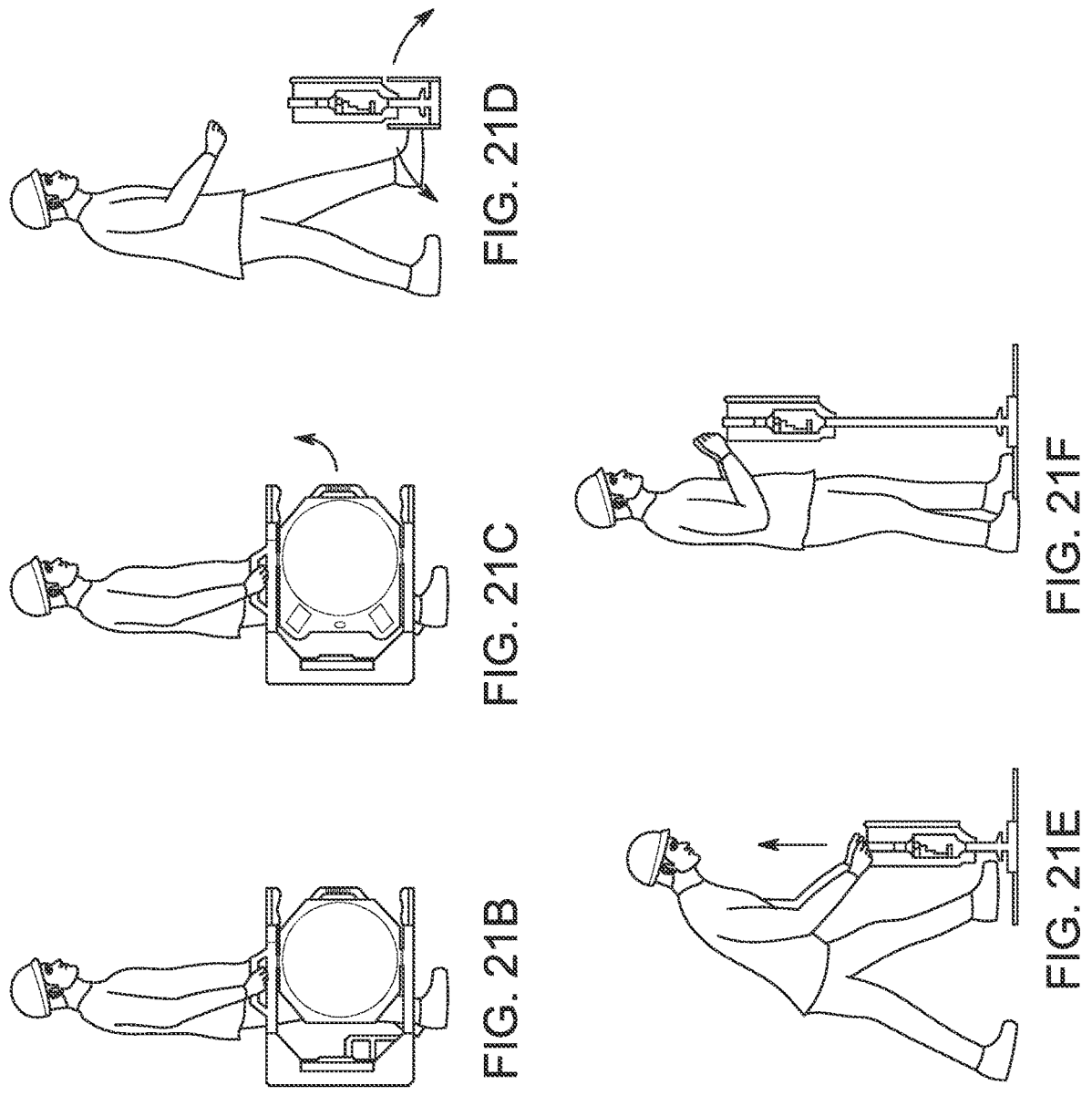
FIG. 21B is a perspective view of a portable fan assembly of FIG. 21A, illustrating the portable fan assembly being carried in a collapsed configuration.
FIG. 21C is a perspective view of the portable fan assembly of FIG. 21A, illustrating the portable fan assembly being carried in the collapsed configuration, indicating a direction of rotation for deployment of the portable fan assembly.
FIG. 21D is a perspective view of the portable fan assembly of FIG. 21A, illustrating the portable fan assembly in the collapsed configuration, indicating a direction of rotation for deployment of a base of the portable fan assembly.
FIG. 21E is a perspective view of the portable fan assembly of FIG. 21A, illustrating the portable fan assembly with the base deployed, indicating a direction of deployment for a fan housing.
FIG. 21F is a perspective view of the portable fan assembly of FIG. 21A, illustrating the portable fan assembly in a deployed configuration.
Figure 21G:
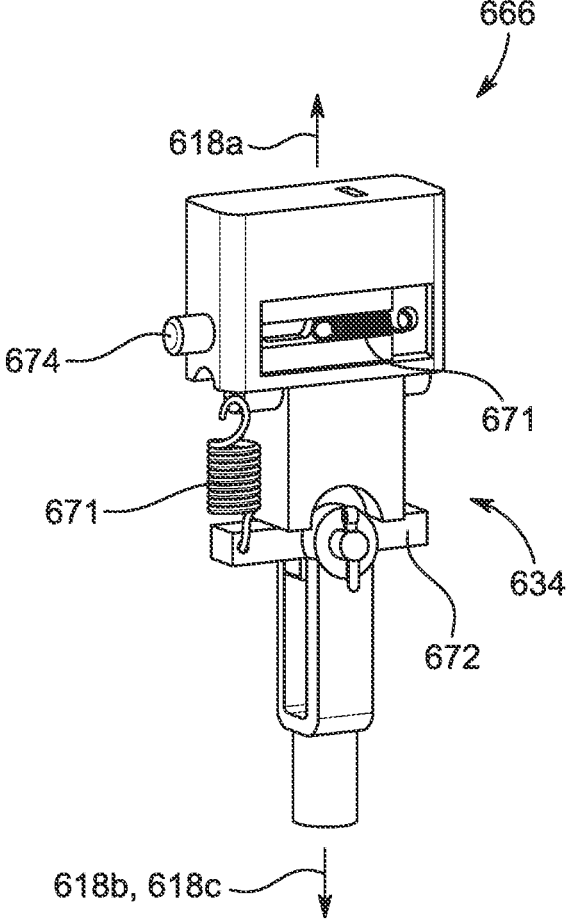
FIG. 21G is a perspective view of the portable fan assembly of FIG. 21A, illustrating a joint of the portable fan assembly.

In some embodiments, as illustrated in FIG. 21G, the alternate base 616*a* may include a slider-pin latch 666 within the second joint 634. The slider-pin latch 666 includes a spring assembly 671, a retainer 672, and a button 674 biased outwardly by the spring assembly 671. The slider-pin latch 666 is positioned within one of the first frame segment 618*a* and the second frame segment 618*b*, and the button 674 is positioned to protrude outwardly from the second joint 634 to prevent sliding between the first frame segment 618*a* and the second frame segment 618*b*. The button 674 may be pressed by a user to rotate the retainer 672 out of preventing engagement between the first frame segment 618*a* and the second frame segment 618*b* and to allow relative sliding therebetween.

With reference back to FIGS. 21B-21F, the fan assembly 600 may be carried by a user via the carrying handle 664 (FIG. 21B) while in the collapsed position. The user may rotate the fan assembly 600 upward (FIG. 21C) and set on the support surface (FIG. 21D). The user may then place the base 616 or the alternate base 616*a* while placing their foot on a portion of the base 616 or the alternate base 616*a* (FIG. 21E). The user may then grasp portions of the fan assembly 600, such as the first gripping portion 626, the second gripping portion 630, the first joint 632, etc. and lift the fan housing 604 relative to the base 616 or the alternate base 616*a* to move the fan assembly 600 from the collapsed configuration to the deployed configuration (FIG. 21F). For example, the user may press the button 674 or buttons to allow movement between the first frame segment 618*a* and the second frame segment 618*b* and move the fan assembly 600 toward the deployed configuration. In some embodiments, the fan assembly 600 includes flip-up/flip-down legs 665 that are selectively moveably relative the base 616 (e.g., the third frame segment 618*c*) or alternate base 616*a* to provide more stability to the fan assembly 600.

FIGS. 22A-23D illustrate a fan assembly 700, such as a portable fan assembly, according to another embodiment. The fan assembly 700 includes a fan housing 704, a grille 708, a fan 712 such as fan impeller, a blade, or a plurality of fan blades, rotatably supported within the fan housing 704, and a base 716. The fan 712 may be powered by a DC power source (e.g., a power tool battery back) or an AC power source (e.g., a wall outlet). The fan assembly 700 also includes an AC pass through.

The fan 712 may be rotated by a motor 714 that can be powered by a DC power source (e.g., a power tool battery back), such as the removable battery pack 1, or an AC power source (e.g., a wall outlet). The fan 712 is positioned within an airflow chamber 705 at least partially defined by the fan housing 704. In the illustrated embodiment, the fan 712 is rotated by the motor 714 to generate airflow through the airflow chamber 705. The fan 712 may be rotated by the motor 714 about a rotation axis 706.

The fan assembly 700 further includes a battery receptacle 715 that can receive the removable battery pack 1. In the illustrated embodiment, the battery receptacle 715 is positioned on the fan housing 704. The base 716 may further support an AC power inlet 717 that can provide charging power to the removable battery pack 1 that is received in the battery receptacle 715. In some embodiments, the AC power inlet 717 is positioned on another part of the fan assembly 700, such as the fan housing 704. In either position, the AC power inlet 717 is electrically coupled to the motor 714, to the battery receptacle 715, or to both, such that the motor 714 could be operated on power provided from the battery pack 1 and/or from motor 714. The fan 712 is positioned within an airflow chamber 705 at least partially defined by the fan housing 704. In the illustrated embodiment, the fan 712 is rotated by the motor 714 to generate airflow through the airflow chamber 705. The fan 712 may be rotated by the motor 714 about a rotation axis 706.

The base 716 may include walls 718 that define a storage area 720 or storage areas. For example, the base 716 may be a toolbox. The base 716 also includes a mating interface 724 configured to interact with other storage units, such as the Milwaukee Tool PACKOUT Modular Storage System. The storage area 720 may also be a space defined in the base 716 for receiving the fan housing 704. As illustrated in FIGS. 22B-22E and 23D, the fan housing 704 is moveably coupled to the base 716 between a stored position (FIGS. 22E and 23A), in which the fan housing 704 is positioned within the storage area 720, and a deployed position (FIGS. 22B-22D, 22F, and 23C), in which the fan housing 704 is at least partially positioned outside of the storage area 720. In the illustrated embodiment, the fan housing 704 may pivot relative to the base 716 between the stored and deployed positions.

In some embodiments, as illustrated in FIGS. 22A-22F, 24, and 25, the mating interface 724 is formed on the fan housing 704, such as on the grille 708 at least partially overlaying the airflow chamber 705, and the base 716. The fan assembly 700 further includes a latch 728 moveably mounted to the base 716 and configured to selectively inhibit relative movement between the fan assembly 700 and another stackable element 732, such as a toolbox, rolling cart, container, and/or the like while the mating interface 724 of the fan assembly 700 interacts with a complementary mating interface of the stackable element 732. When the mating interface 724 is formed on the grille 708, the fan housing 704 is retained in the storage area 720 (e.g., in the stored position) while the stackable element 732 is stacked on top of the fan assembly 700.

As illustrated in FIGS. 23A-23D, the mating interface 724 is not formed on the grille 708, but rather formed on the base 716 such that the fan housing 704 is moveable out of the storage area 720 (e.g., to the deployed position) even while the stackable element 732 is stacked on top of the fan assembly 700. In other words, when the mating interface 724 is formed on the fan housing 704, the fan housing 704 is not able to move between the stored position and the deployed position while the stackable element 732 is stacked on top of the fan assembly 700, and when the mating interface 724 is formed on the base 716, the fan housing 704 is able to move between the stored position and the deployed position while the stackable element 732 is stacked on top of the fan assembly 700 such that the fan housing 704 is operable to generate airflow in a plurality of directions even when the fan assembly 700 and the stackable element 732 are stacked. The mating interface 724 further supports stacking and interlocking of the fan assembly 700 on top of the stackable element 732. In some embodiments, the fan assembly 700 can be stacked on top of the stackable element 732 (e.g., on a lid of the stackable element 732) in a side-by-side arrangement with another fan assembly 700 or another stackable element 732.

Figures 23A, 23B:
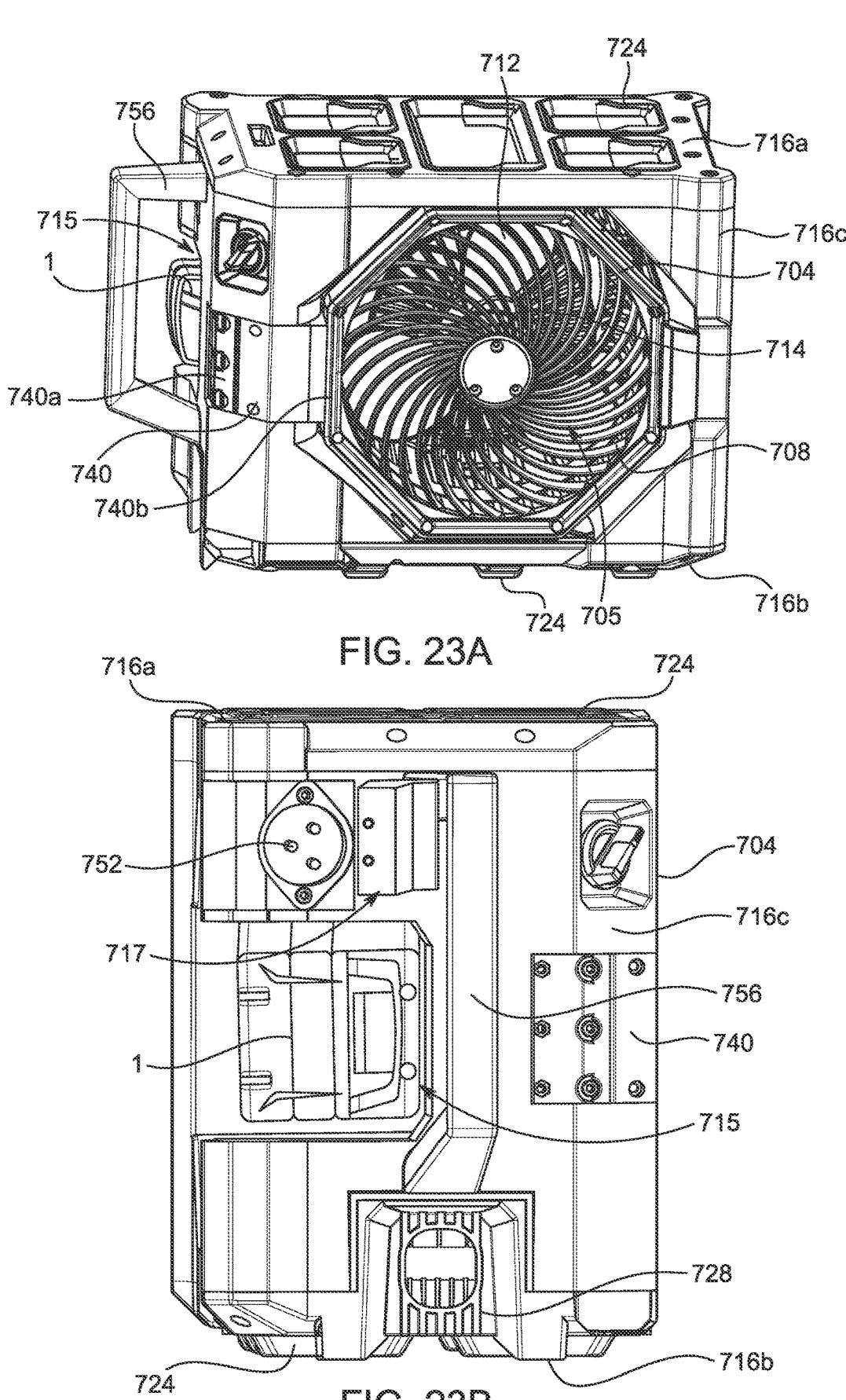
FIG. 23A is a perspective view of a fan assembly, according to another embodiment.
FIG. 23B is another perspective view of the fan assembly of FIG. 23A.
Figure 23C:
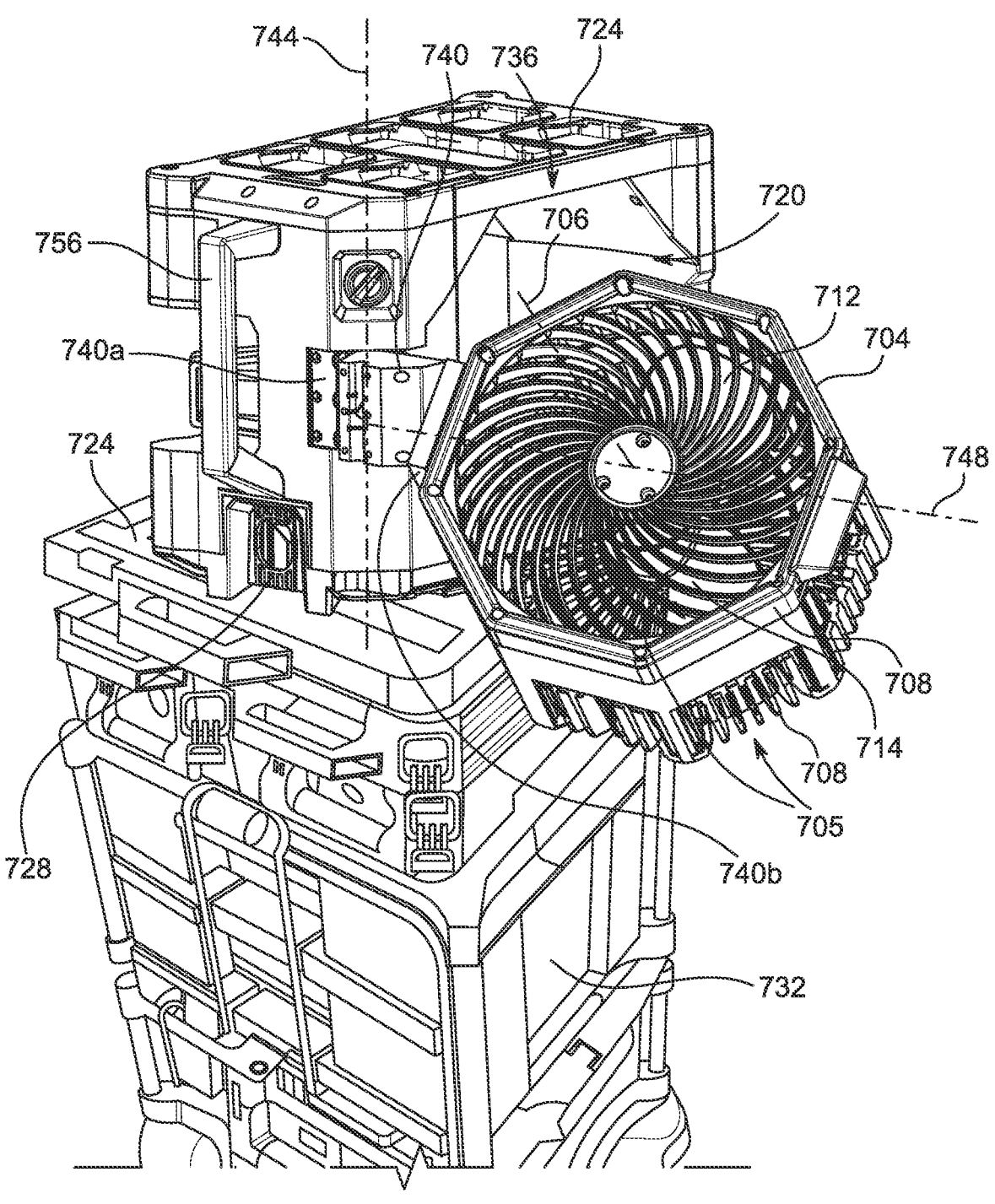
FIG. 23C is a perspective view of the fan assembly of FIG. 23A, illustrating the fan assembly stacked on top of another stacking element.

As illustrated in FIGS. 23A-23D, the base 716 includes a first wall 716a having a first part of the mating interface 724 configured to interact with the stackable element 732, a second wall 716b opposite the first wall 716a having a second part of the mating interface 724 configured to interact with the stackable element 732, and a wall or a plurality of walls 716c, extending between the first wall 716a and the second wall 716b, defining an opening 736 to the storage area 720 in the base 716. In the deployed position, the fan housing 704 is at least partially extended out of the storage area 720 through the opening 736. In the illustrated embodiment, the plurality of walls 716c defines an outer perimeter of the base 716. In some embodiments, the outer perimeter is polygonal. In some embodiments, the outer perimeter is circular. In the illustrated embodiment, the outer perimeter is rectangular, and may even be square. As illustrated in FIG. 23C, the fan assembly 700 can be stacked on the stackable element 732 in an upright position in which the first wall 716a and the second wall 716b are positioned at opposing upper and lower sides of the base 716, and the plurality of walls 716c are positioned on sides of the base 716.

Figure 23D:
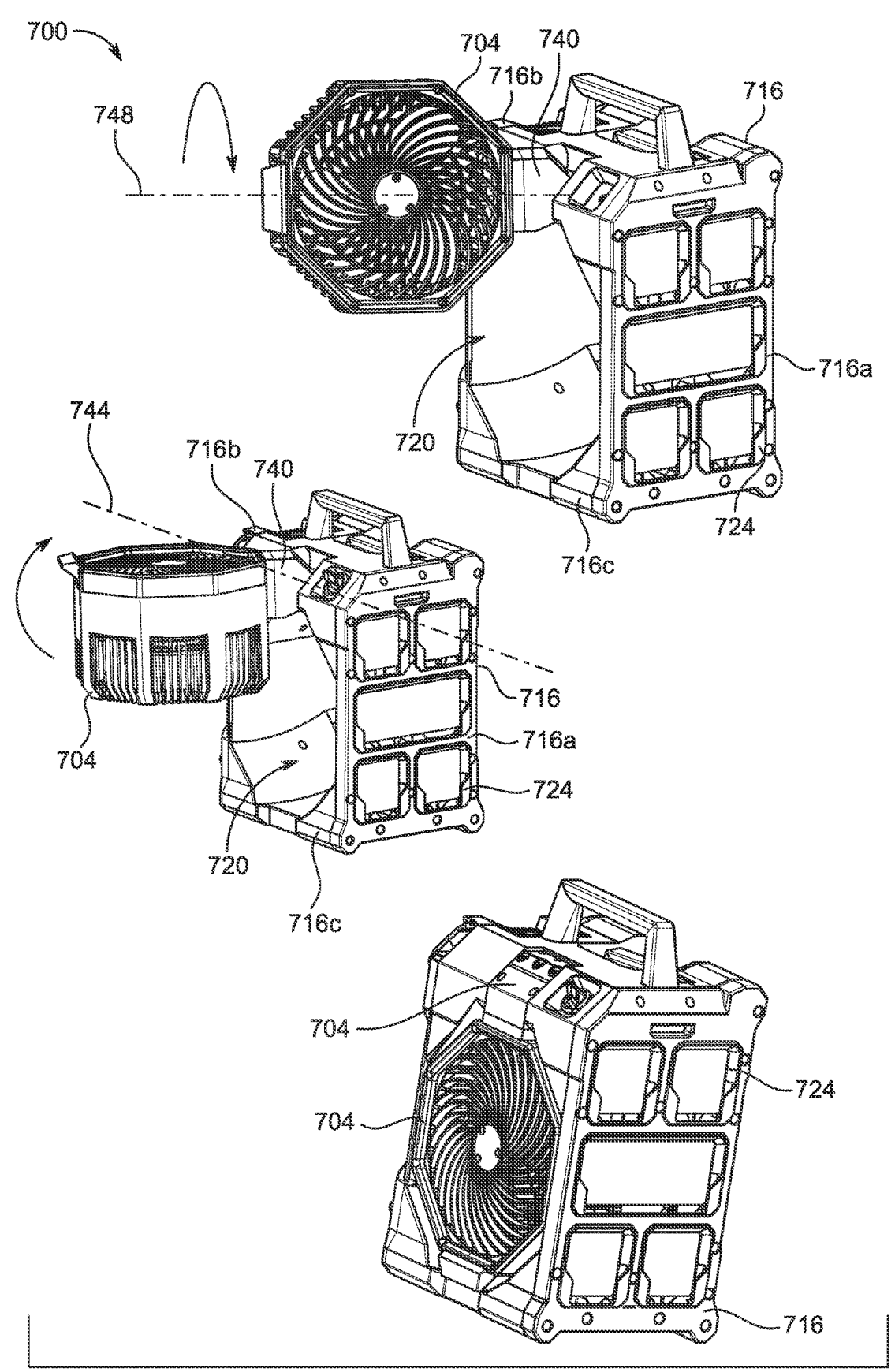
FIG. 23D includes perspective views illustrating the fan assembly of FIG. 23A in a collapsed configuration and multiple deployed configurations.

Referring now to FIGS. 23C and 23D, the fan assembly 700 further includes a joint or coupler 740 moveably connecting the fan housing 704 to the base 716. The coupler 740 has a first end 740a pivotally connected to the base 716 about a first axis 744, and a second end 740b rotatably connected to the fan housing 704 about a second axis 748 that is transverse relative to the first axis 744. The fan housing 704 is configured to be selectively pivoted relative to the base 716 about the first axis 744 to move the fan housing 704 into and out of the storage area 720 and selectively rotated relative to the base 716 about the second axis 748 to change a direction of airflow generated by the fan 712. In other words, the coupler 740 is moveable to alter both a pitch and a yaw of the fan housing 704 relative the base 716. As best illustrated in FIG. 23C, both the pitch and the yaw of the fan housing 704 (e.g., first axis 744 and second axis 748) may be altered while the stackable element 732 is stacked on the fan assembly 700 to move the fan housing 704 between the stored position and the deployed position. As such, the fan housing 704 may move about two degrees of freedom relative to the base 716.

Figure 22A:
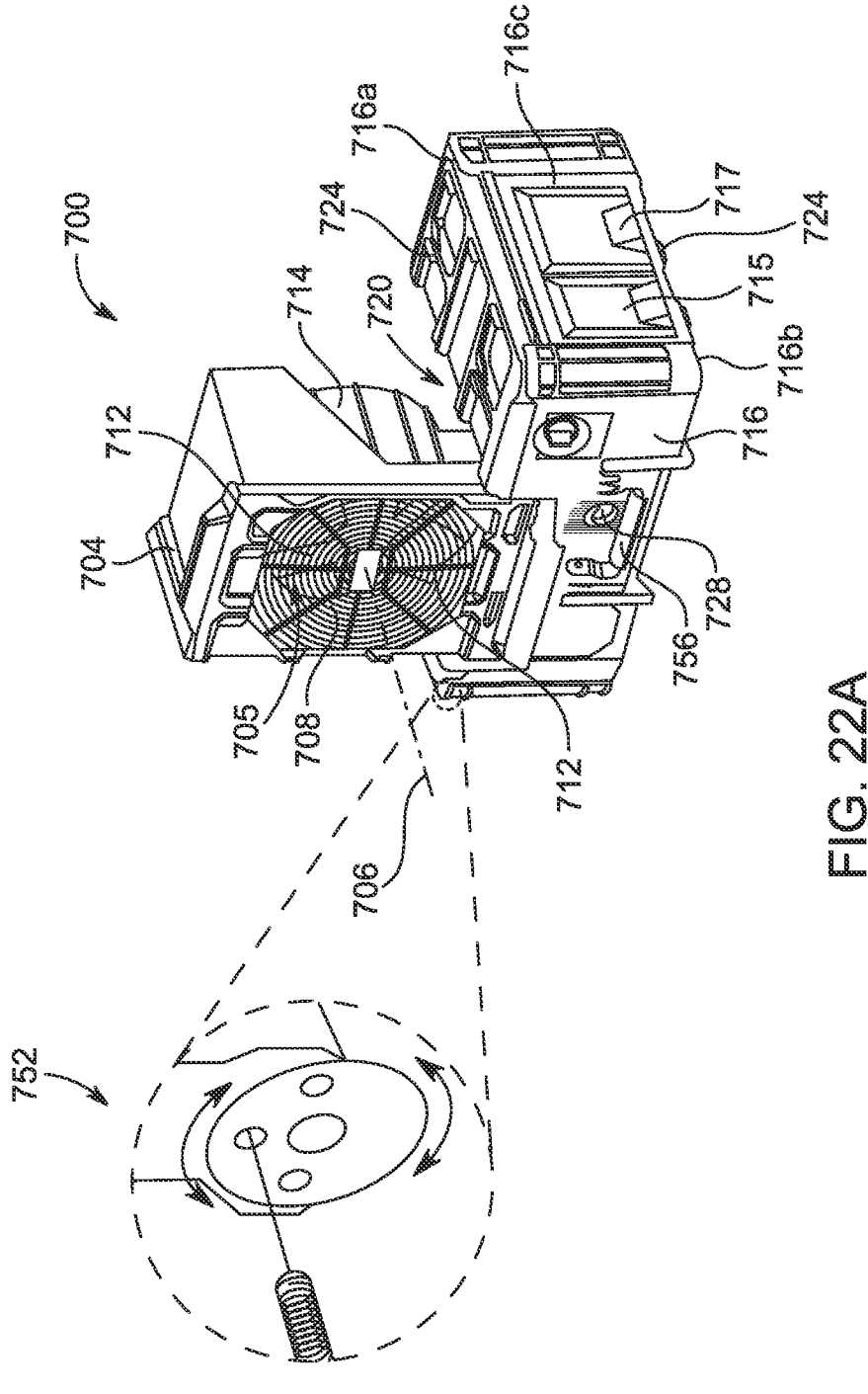
FIG. 22A is a perspective view of a fan assembly, according to another embodiment.
Figures 22B, 22C, 22D, 22E:
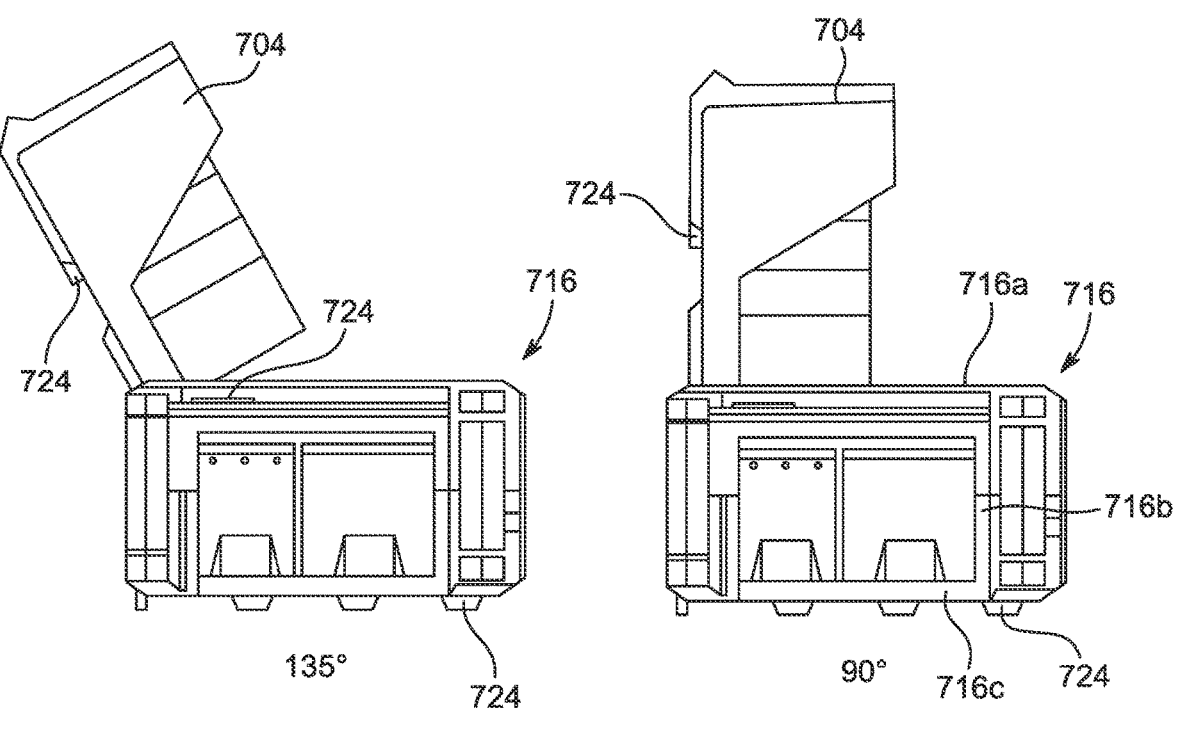
FIG. 22B is a perspective view of the fan assembly of FIG. 22A in one deployed configuration.
FIG. 22C is a perspective view of the fan assembly of FIG. 22A in another deployed configuration.
FIG. 22D is a perspective view of the fan assembly of FIG. 22A in still another deployed configuration.
FIG. 22E is a perspective view of the fan assembly of FIG. 22A in a collapsed configuration.
Figure 22F:
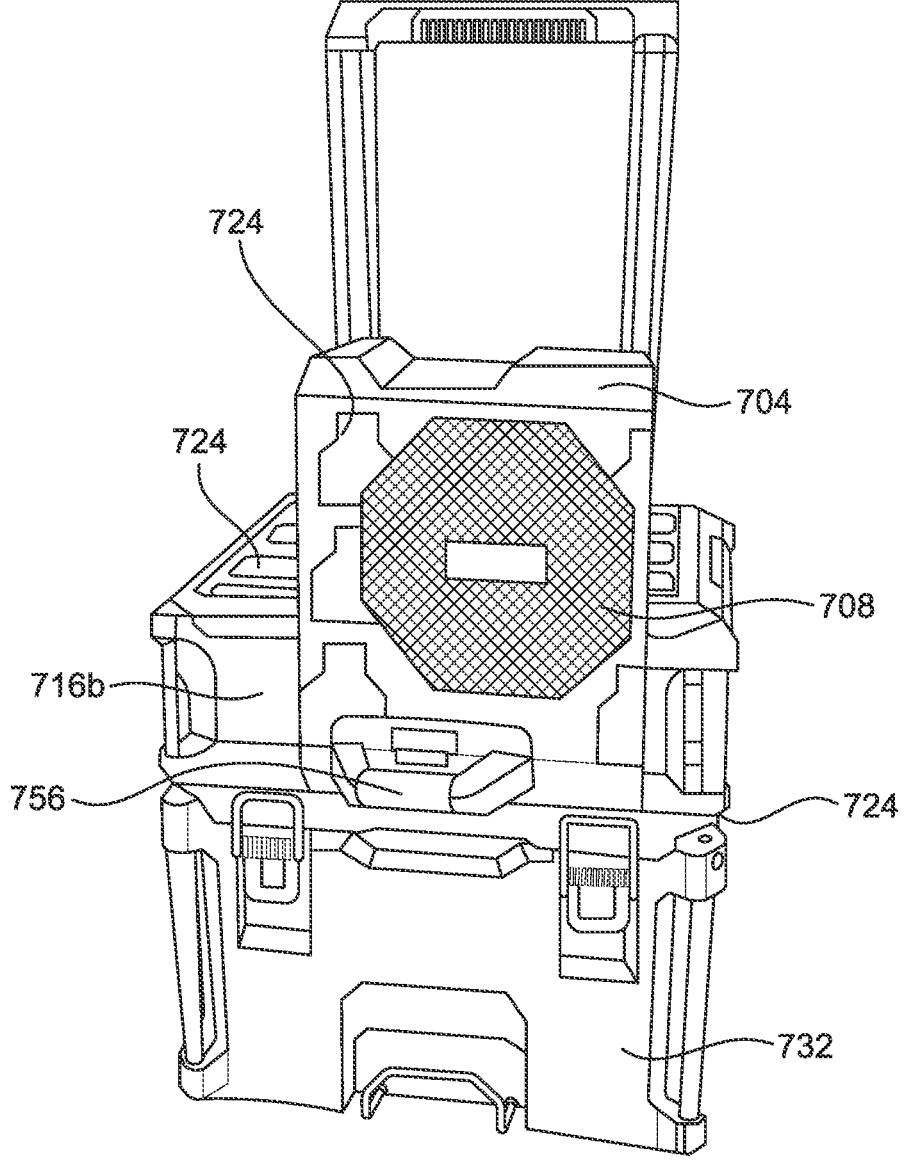
FIG. 22F is a perspective view of the fan assembly of FIG. 22A, illustrating the fan assembly stacked on top of another stacking element.

In some embodiments, as illustrated in FIGS. 22A and 23B, a detent mechanism 752 may releasably hold the fan housing 704 in set positions (e.g., 0 degrees, 45 degrees, 90 degrees, and 135 degrees) relative to the base 716. In other words, the detent mechanism 752 is configured to be set to a predetermined position by a user, where the predetermined position corresponds to an angular position of the fan housing 704 relative to the base 716. In some embodiments, the fan assembly 700 even further includes a handle 756 configured to accommodate carrying of the fan assembly 700 while stacked with or unstacked from the stackable element 732. The handle 756 may be positioned on the fan housing 704, the base 716, or both.

Figure 24:
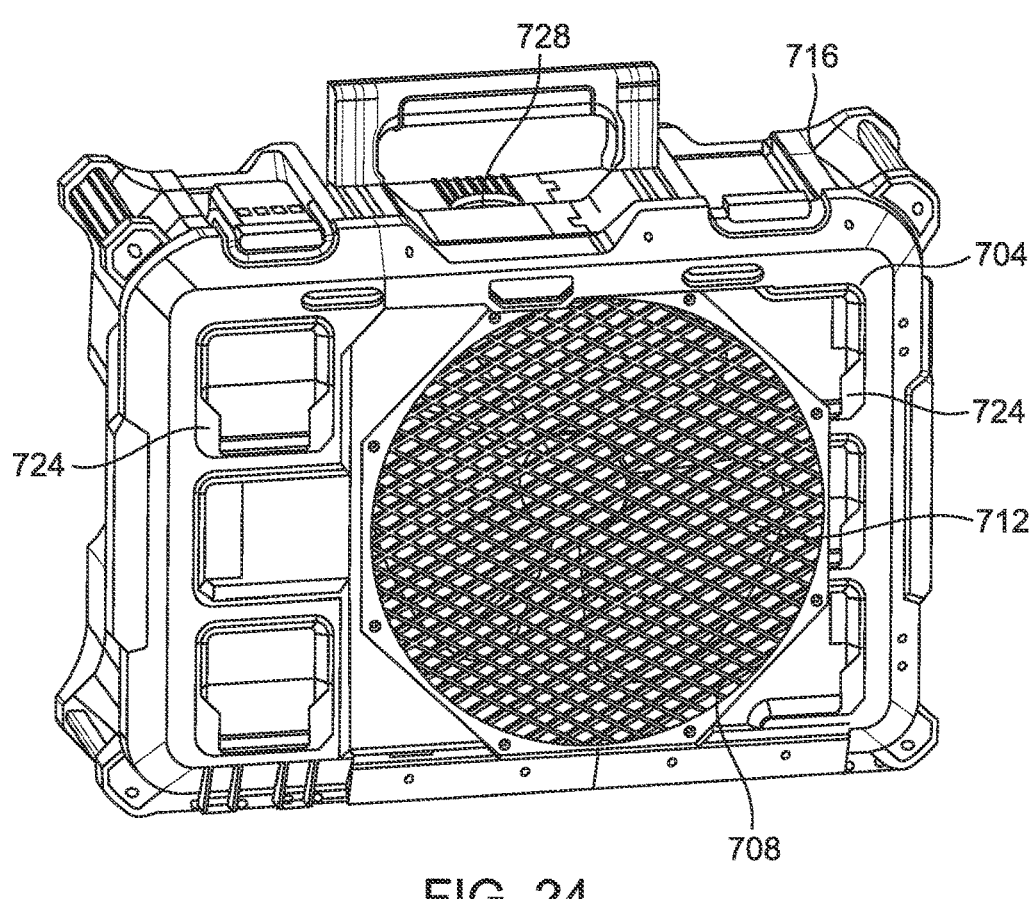
FIG. 24 is a perspective view of a fan assembly, according to another embodiment.
Figure 25:
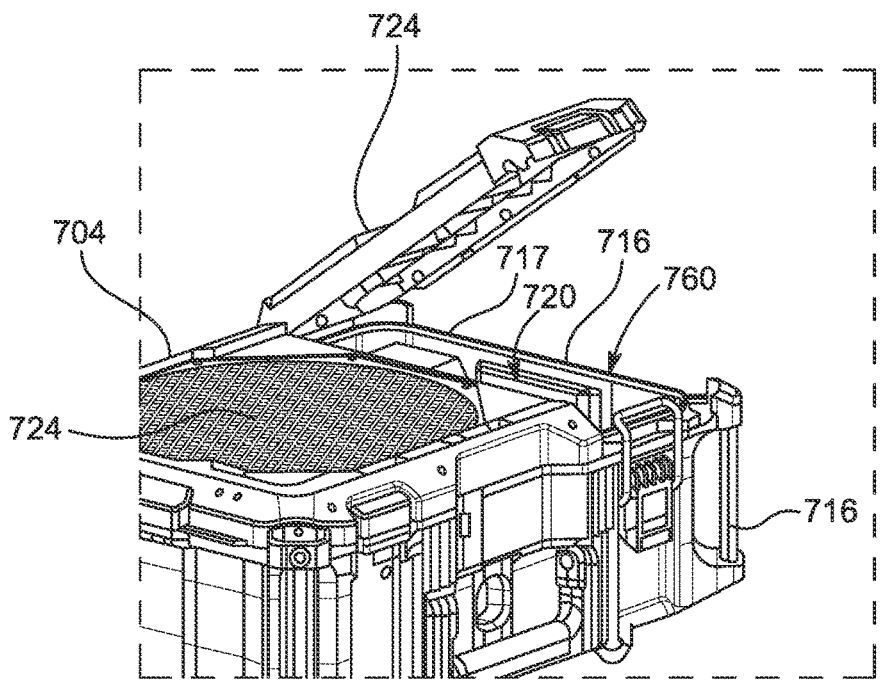
FIG. 25 is a perspective view of the fan assembly of FIG. 24, illustrating an open storage compartment on the fan assembly.

In some embodiments, as illustrated in FIGS. 24 and 25, the fan housing 704 may be smaller than the outer perimeter of the fan assembly 700 or base 716, and the fan assembly 700 may further include a storage compartment 760 separate from the storage area 720. The storage compartment 760 may hold tools, tool bits, and/or the like. In some embodiments, the battery receptacle 715 and/or AC power inlet 717 are positioned within the storage compartment 760. The storage compartment 760 may also be waterproof and or sealable.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A battery powered fan assembly comprising:
   a fan housing that at least partially defines an airflow chamber;
   a plurality of fan blades positioned within the airflow chamber;
   a motor operable to rotate the plurality of fan blades;
   a battery receptacle configured to receive a removable battery pack to power the motor; and
   a base assembly configured to be placed on a support surface, the base assembly including
   a first frame segment including two parallel, spaced apart beams, wherein the fan housing is coupled to the first frame segment between the two parallel, spaced apart beams of the first frame segment,
   a second frame segment pivotally coupled to the first frame segment, the second frame segment including two parallel, spaced apart beams of the second frame segment, and
   a third frame segment pivotally coupled to the second frame segment,
   wherein the base assembly is configured to be collapsed into a storage configuration in which the first frame segment is folded onto and overlies the second frame segment, and the second frame segment is folded onto and overlies the third frame segment,
   wherein the base assembly is configured to be expanded to a first deployed configuration in which the fan housing is elevated above the support surface by a first height, and

wherein the base assembly is configured to be expanded to a second deployed configuration in which the fan housing is elevated above the support surface by a second height that is different than the first height.

2. The battery powered fan assembly of claim 1, wherein while in the first deployed configuration, the first frame segment is folded on the second frame segment, and the second frame segment is unfolded from the third frame segment.

3. The battery powered fan assembly of claim 2, wherein while in the second deployed configuration, the first frame segment is unfolded from the second frame segment and the second frame segment is unfolded from the third frame segment.

4. The battery powered fan assembly of claim 3, wherein the first height is less than the second height.

5. The battery powered fan assembly of claim 4, wherein the first height is between approximately ten inches and approximately twenty inches, and wherein the second height is between approximately thirty inches and approximately fifty inches.

6. The battery powered fan assembly of claim 5, wherein the first height is approximately fifteen inches, and wherein the second height is approximately forty-two inches.

7. The battery powered fan assembly of claim 1, wherein the first frame segment includes a first reduced sized gripping portion, and wherein the second frame segment includes a second reduced sized gripping portion.

8. The battery powered fan assembly of claim 7, wherein while in the storage configuration, the first reduced sized gripping portion and the second reduced sized gripping portion are positioned adjacent to one another.

9. The battery powered fan assembly of claim 1, further comprising a self-locking latch positioned between the second frame segment and the third frame segment, wherein the self-locking latch is biased into a locked position to inhibit relative movement between the second frame segment and the third frame segment.

10. The battery powered fan assembly of claim 9, wherein the base assembly further includes:
a first joint connecting the fan housing and the first frame segment,
a second joint connecting the first frame segment and the second frame segment, and
a third joint connecting the second frame segment to the third frame segment,
wherein the second joint includes a friction hinge.

11. The battery powered fan assembly of claim 10, wherein the self-locking latch is positioned within the third joint.

12. The battery powered fan assembly of claim 1, wherein the second frame segment is pivotal toward the storage configuration relative to the third frame segment in a first direction, and wherein the first frame segment is pivotal toward the storage configuration relative to the second frame segment in a second direction.

13. The battery powered fan assembly of claim 12, wherein the first direction is opposite to the second direction.

14. A battery powered fan assembly comprising:
a fan housing that at least partially defines an airflow chamber;
a plurality of fan blades positioned within the airflow chamber;
a motor operable to rotate the plurality of fan blades;
a battery receptacle configured to receive a removable battery pack to power the motor;
a base assembly configured to be placed on a support surface, the base assembly including
a first frame segment pivotally coupled to the fan housing about a first axis,
a second frame segment having a first end and a second end opposite the first end, the first end pivotally coupled to the first frame segment about a second axis,
a third frame segment pivotally coupled to the second end of the second frame segment about a third axis,
a self-locking latch positioned between the second frame segment and the third frame segment, the self-locking latch biased into a locked position to inhibit relative movement between the second frame segment and the third frame segment, and
a friction hinge positioned between the first frame segment and the second frame segment;
wherein the first, second, and third axes are parallel to each other.

15. The battery powered fan assembly of claim 14, wherein the first frame segment is pivotable relative to the second frame segment to alter a height of the fan housing relative to the support surface by a first amount.

16. The battery powered fan assembly of claim 15, wherein the second frame segment is pivotable relative to the third frame segment to alter the height of the fan housing relative to the support surface by a second amount that is different than the first amount.

17. The battery powered fan assembly of claim 1, wherein the third frame segment includes a first end coupled to the second frame segment and a second end opposite the first end, and wherein in the storage configuration, the second end of the third frame segment is adjacent the second frame segment.

18. The battery powered fan assembly of claim 17, wherein the second frame segment includes a first end coupled to the first frame segment and a second end coupled to the third frame segment, and wherein in the storage configuration, the second end of the third frame segment is closer to the first end of the second frame segment than to the second end of the second frame segment.

19. The battery powered fan assembly of claim 1, wherein in the storage configuration, the first frame segment extends parallel to the second frame segment, the second frame segment extends parallel to the third frame segment, and the second frame segment is located between the first frame segment and the third frame segment.

* * * * *